United States Patent [19]

Oakes et al.

[11] Patent Number: 5,182,438
[45] Date of Patent: Jan. 26, 1993

[54] FOOD SERVICE APPARATUS AND PROCESS

[75] Inventors: Roger K. Oakes, Nashville; Kevin B. Cundiff, Brentwood, both of Tenn.

[73] Assignee: Aladdin Synergetics, Inc., Nashville, Tenn.

[21] Appl. No.: 463,471

[22] Filed: Jan. 11, 1990

[51] Int. Cl.⁵ .............................................. H05B 3/68
[52] U.S. Cl. .................................... 219/386; 219/521
[58] Field of Search ............... 219/385, 386, 387, 521, 219/455, 458, 459, 463, 467

[56] References Cited

U.S. PATENT DOCUMENTS

| | | | |
|---|---|---|---|
| Re. 30,623 | 5/1981 | Schulz et al. ................ | 165/48 R |
| 2,222,065 | 11/1940 | Blakeslee . | |
| 2,625,640 | 1/1953 | Gaiser .......................... | 219/522 |
| 2,668,222 | 2/1954 | McCormick . | |
| 2,844,696 | 7/1958 | Custer .......................... | 219/213 |
| 2,893,805 | 7/1959 | Ferguson ..................... | 312/214 |
| 2,906,412 | 9/1959 | Tanner . | |
| 3,042,384 | 7/1962 | Bauman . | |
| 3,140,389 | 7/1964 | Windes . | |
| 3,244,858 | 4/1966 | Thorpe ......................... | 392/435 |
| 3,270,660 | 9/1966 | Filipak . | |
| 3,358,120 | 12/1967 | Schibley ...................... | 219/395 |
| 3,608,627 | 9/1971 | Shevlin ........................ | 165/2 |
| 3,751,629 | 8/1973 | Eisler ........................... | 219/521 |
| 3,752,549 | 8/1973 | Binks et al. . | |
| 3,797,563 | 3/1974 | Hoffmann et al. . | |
| 3,799,143 | 3/1974 | Bridges . | |
| 3,842,724 | 10/1974 | Korr et al. .................... | 99/358 |
| 3,875,370 | 4/1975 | Williams . | |
| 3,886,346 | 5/1975 | Meyers . | |
| 3,887,253 | 6/1975 | Bridges et al. ............... | 312/250 |
| 3,908,749 | 9/1975 | Williams ...................... | 165/2 |
| 3,924,100 | 12/1975 | Mack ............................ | 219/386 |
| 3,965,969 | 6/1976 | Williamson .................. | 165/12 |
| 3,982,584 | 9/1976 | Spanoudis . | |
| 3,987,719 | 10/1976 | Kian . | |

(List continued on next page.)

FOREIGN PATENT DOCUMENTS 1219352 5/1960 France .

OTHER PUBLICATIONS

Aladdin 1987 Brochure entitled "Aladdin Advanced Meal System".
Therma Chill Food Production Systems Brochure entitled "Perfect Temp-Quality Meals at Lower Operating Costs".

(List continued on next page.)

Primary Examiner—Teresa J. Walberg
Attorney, Agent, or Firm—Banner, Birch, McKie & Beckett

[57] ABSTRACT

A food preparation and/or storage apparatus includes modular removable elements having a drawer with one connector for mechanical and electrical engagement with a heat only chamber and electrical connections to a removable heat transfer element. The heat transfer element also provides power from one removable heater to an adjacent removable heater. A shim positions a heat transfer element relative to a supporting drawer. A template releasably positions a center of each container directly above at least one heat transferring surface. A power connector includes a rubber-like grommet for tolerance in connecting to an external power source. A method of and an apparatus for adjusting the height of a plurality of vertically oriented shelves in a housing allows a plurality of vertically stacked shelves to be accessed from substantially the same height. The heat transfer element provides conduction heat to the container of food and, in combination with a heated air directing element, provides convection heating to the same food. Frozen food can be heated. Improved insulation is obtained by minimizing chamber to frame contact, by minimizing the clearance between drawers and spacer bars while a portion of the drawer is disposed outside the chamber and by adding a drawer gasket seal which contacts at least one of the spacer bars when the drawer is in a closed position. Waterproof electrical connections are included in the chamber element, on the drawer and on the heat transfer element.

46 Claims, 20 Drawing Sheets

U.S. PATENT DOCUMENTS

| | | | |
|---|---|---|---|
| 4,005,745 | 2/1977 | Colato et al. | 165/2 |
| 4,019,022 | 4/1977 | Seider et al. | 219/386 |
| 4,041,277 | 8/1977 | Shumrak et al. | 219/386 |
| 4,052,589 | 10/1977 | Wyatt | 219/400 |
| 4,068,115 | 1/1978 | Mack et al. | |
| 4,087,142 | 5/1978 | Aumack | |
| 4,093,041 | 6/1978 | Davis et al. | 186/1 D |
| 4,110,587 | 8/1978 | Souder, Jr. et al. | 219/10.49 R |
| 4,156,456 | 5/1979 | Muller | 165/48 R |
| 4,167,983 | 9/1979 | Seider et al. | 180/19 R |
| 4,194,109 | 3/1980 | Springer | |
| 4,203,486 | 5/1980 | Rubbright et al. | 165/48 R |
| 4,232,789 | 11/1980 | Springer | 206/562 |
| 4,235,282 | 11/1980 | de Filippis et al. | 165/61 |
| 4,254,824 | 3/1981 | Springer | |
| 4,285,391 | 8/1981 | Bourner | 219/386 |
| 4,323,110 | 4/1982 | Rubbright | 219/521 |
| 4,346,756 | 8/1982 | Dodd et al. | 165/48 R |
| 4,384,191 | 5/1983 | Guibert | |
| 4,399,667 | 8/1983 | Lamb | |
| 4,455,478 | 6/1984 | Guibert | |
| 4,493,978 | 1/1985 | Starnes | 219/438 |
| 4,517,446 | 5/1985 | Torning | |
| 4,584,466 | 4/1986 | de Mola | 219/386 |
| 4,767,915 | 8/1988 | Hurley | 219/459 |
| 4,776,386 | 10/1988 | Meier | 165/48.1 |
| 4,780,597 | 10/1988 | Linhart et al. | |
| 4,781,243 | 11/1988 | DeVogel et al. | |
| 4,881,590 | 11/1989 | Meier | |
| 4,967,057 | 10/1990 | Bayless | 219/213 |

OTHER PUBLICATIONS

Aladdin Brochure entitled "Temp-Rite II Excel".
Aladdin Brochure entitled "Walk-In Rethermalization Refrigerator".
Counselor 1988, vol. 10, Issue 1.
Article, "One Decision Made All the Difference", Cahners Publishing Company, Jun. 1987.
Brochure: "Aladdin Advanced Meal System", Oct. 1988.
Brochure: "Aladdin Advanced Meal System: Rethermalization System", Oct. 1988.

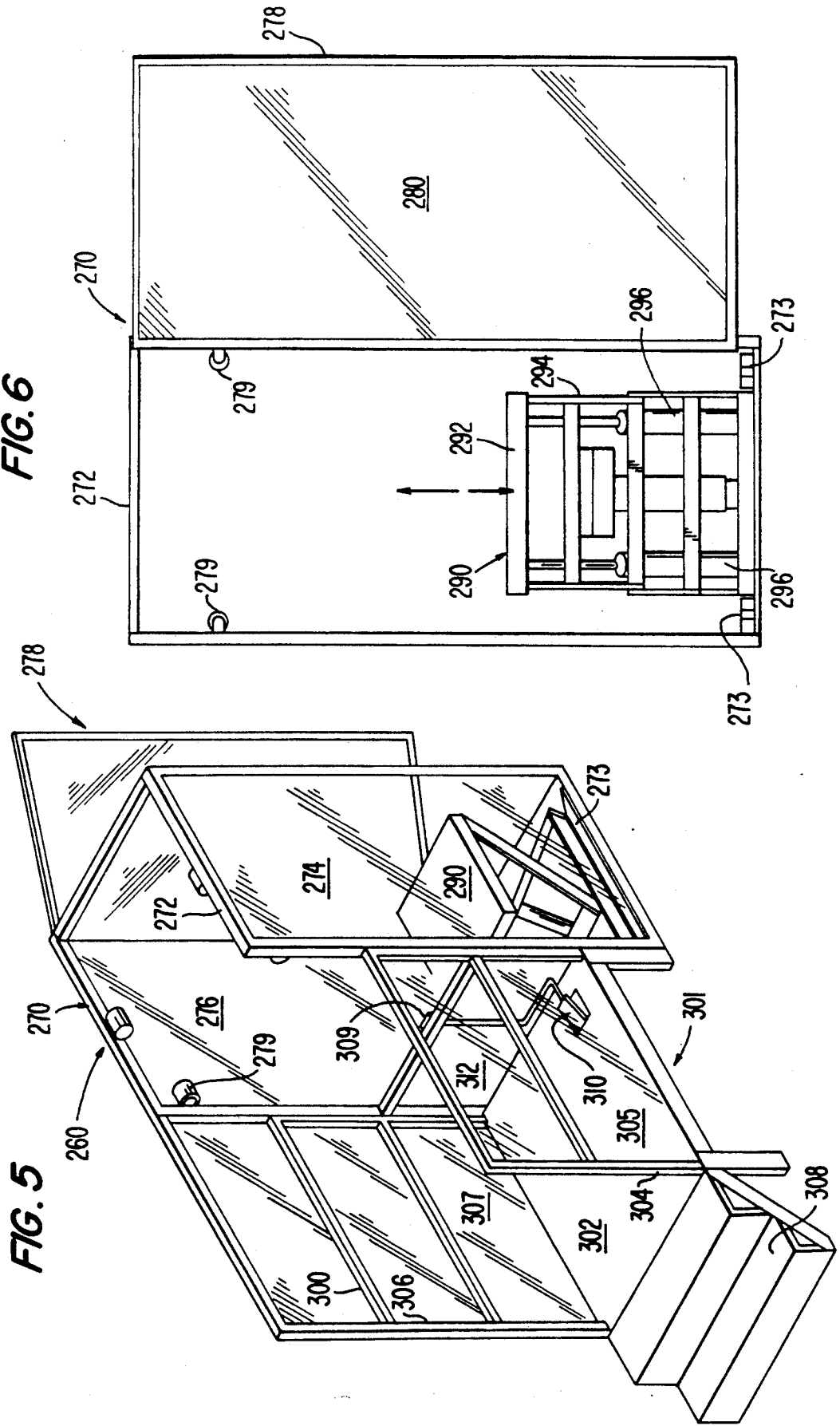

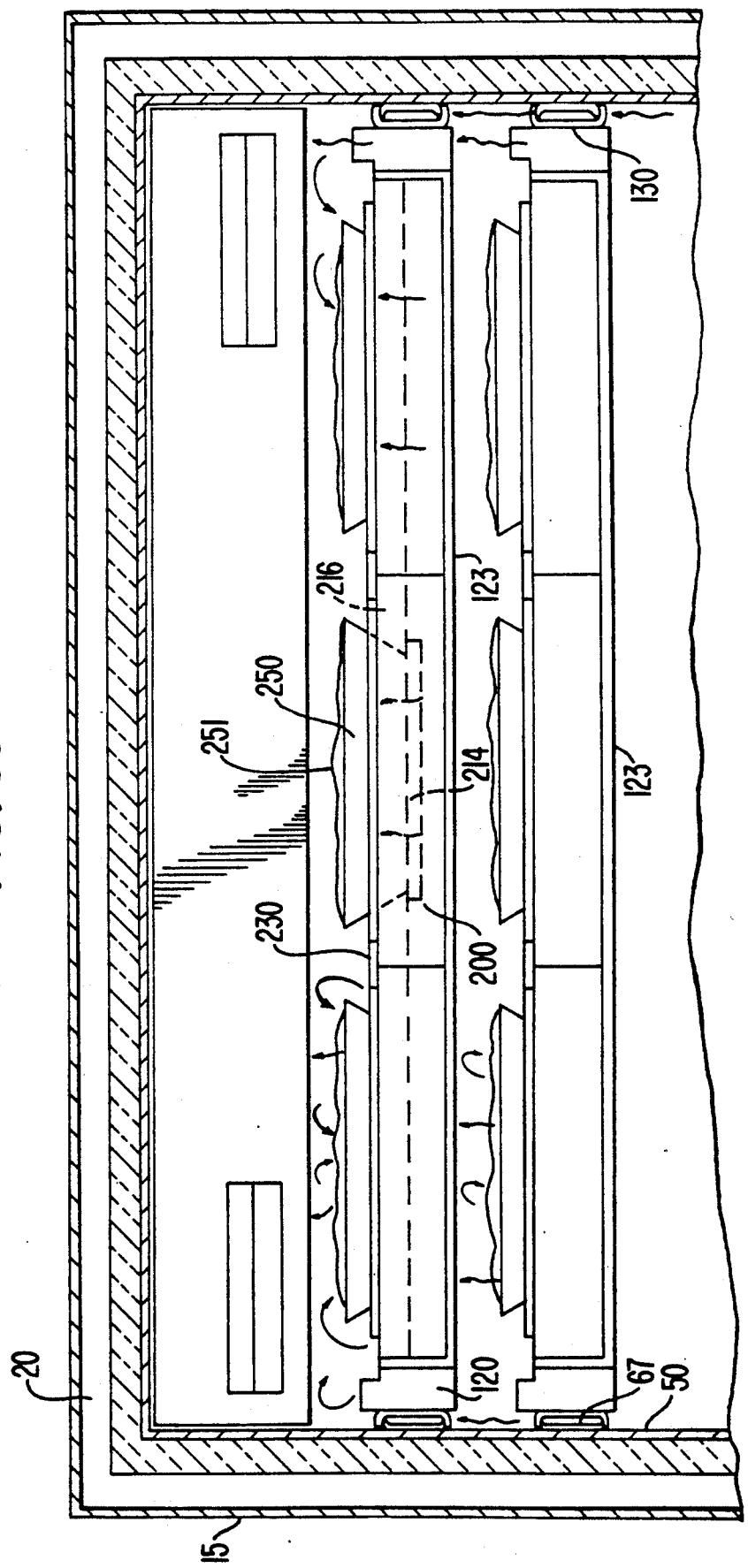

FOOD SERVICE APPARATUS AND PROCESS

TECHNICAL FIELD

The present invention relates to food service systems. In particular, the food service apparatus and process of the present invention are directed towards a modular system allowing removability of a plurality of supporting shelves or drawers, a plurality of heating elements and a plurality of containers of food without the use of tools. The present invention is also directed to an improved conduction/convection heating apparatus and method, to an apparatus and a method for adjusting the height of a housing, to improved insulation and to waterproof connections.

BACKGROUND OF THE INVENTION

The present invention addresses several problems in known food service apparatuses and processes.

A representative current procedure for supplying food at institutions or the like requires lengthy set-up time and, thus, increases scheduling problems. A current airline heating procedure at least includes the steps of placing frozen meals on sheet pans, adding an insulated cover to the meals, placing the sheet pans on racks in a rethermalization cart, tempering the food to about 40° F. (for example, thawing overnight under refrigeration), activating a timer to cause preheating of the oven, removing the insulated cover, covering the food with foil, perforating the foil, heating the tempered food in about forty minutes, testing for 180° temperature, removing the foil, possibly physically transferring the cart to an assembly line, removing the hot food from the cart, assembling the hot food dishes onto trays containing cold food, stacking the trays and applying an insulated cover.

The known prior art includes one or two removable elements, such as a tray or a shelf, in a system. The known prior art does not, however, address modular systems in which the container of food, a food positioning template, a heat transferring element, and a multi-function drawer are all removable from a chamber without the use of tools for ease of cleaning and simplicity of repairs. Also, several known systems include exposed electrical elements on the chamber which could lead to exposed hot prongs if the chamber circuit was turned on and the mating drawer, shelf, tray or the like was not inserted in the chamber.

The known prior art also does not appear to teach the advantages of a multi-function drawer or shelf in a chamber which not only can support heat transferring elements, but can also provide power to heat transfer elements and direct heat downward towards a subjacent container of food. In addition, the known prior art does not appear to teach a one-element mechanical and electrical removable engagement of this multi-function drawer with the chamber which is secure during moving of a portable housing. With respect to the removable heat transfer element, the prior art does not appear to teach the advantage of using a removable heat transfer element to supply power to an adjacent heat transfer element to extend the number of removable heat transfer elements which could be disposed on one removable drawer or shelf. Further, the prior art does not appear to identify the advantages of having removable positioning templates of differing shapes to increase the flexibility of the heating chamber to handle different shaped containers of food to be heated.

Ovens which primarily provide conduction-only heating, are not advantageous for cooking frozen foods, because the top may not cook before the bottom scorches. With portable convection-only ovens, the heating is slow and these ovens have a tendency to dry out the food. Thus, many prior art devices rely on a separate rethermalization step to thaw the frozen food to the tempered (40°-50° F.) range before heating by conduction. U.S. Pat. No. 3,608,627 to Shevlin, however, teaches going directly from a frozen state to a heated state. There are, though, problems with the structure of Shevlin. Shevlin still includes the complexity of a combined refrigerating/heating chamber. It also has a complicated covered casserole structure and possibly heats the frozen food too rapidly. In Shevlin, a sheet or foil and a cover must be added to a container either before loading or while the container is in the chamber, and the same sheet or foil and cover must be removed after heating. In addition, heating frozen food in under thirty minutes as taught by Shevlin, likely requires using a high temperature heater element and, thus, introduces the likelihood of scorching the food.

With respect to insulation, many rethermalization systems merely use an insulated cover over a container to try to prevent heat loss to the inside of a refrigerated chamber and to try to prevent cool air from coming into the food in the covered container. With respect to the inside of the chamber in relation to the surrounding environment, known prior art devices rely primarily on filling cavities with commercial insulation materials. Known prior art devices do not appear to address designing the actual structure of the housing and its associated elements to further aid in keeping the inside of the chamber at the desired temperature. Also, known prior art devices doe not appear to teach ways to minimize the amount of ambient air which contacts food in a container, when a portion of the housing or chamber is opened for allowing access to other containers of the same chamber.

Finally, known prior art devices do not appear to address waterproofing the electrical connectors on the inside of a chamber, waterproofing the electrical connectors on a removable drawer or shelf and waterproofing the electrical connectors on removable heat transfer elements so that the removable elements and the chamber can be pressure water cleanable.

The food preparation apparatus and process of the present invention was developed to overcome the structural and functional limitations of the prior art systems and methods discussed above.

SUMMARY OF THE INVENTION

The present invention is directed to a food preparation or food storage apparatus and process.

A preferred food preparation apparatus of the present invention includes a chamber, an electrical terminal mounted on the chamber and a removable heat transfer element disposed in the chamber. A plurality of vertically arranged drawers, shelves or the like support heat transfer elements. Each supporting drawer is removably received in the chamber and includes a first connector for releasably electrically connecting the supporting drawer to the terminal. Each supporting drawer also includes a conduit or the like for distributing power from the first electrical connector to the heat transfer element. In addition, the heat transfer element includes a connector for releasably electrically connecting to the power distribution conduit of the supporting drawer.

A drawer or the like includes a surface for receiving a plurality of removable heat transfer elements. It also includes guide rails or the like for sliding the drawer into and out of the chamber. In addition, a single element is used for both releasably electrically connecting the drawer to the chamber and for releasably mechanically engaging the drawer with the chamber. A preferred method of heating food in a container which is inside a chamber includes the step of closing the drawer to simultaneously mechanically engage and electrically connect the drawer to a power source in the chamber and heating the entire chamber until the food in the container is between a temperature of 180° and 200° F. This supporting drawer could alternatively or in addition to the above include a power distributing conduit having a connector for removably electrically connecting the apparatus to the chamber and a receptacle for receiving a male electrical connector of a removable heat transfer element.

A preferred apparatus for transferring heat to a container of food and for providing power to an adjacent heat transferring apparatus includes a housing having a first surface and a second surface substantially parallel to the first surface. It also includes an electrical plug extending from a first surface of the housing and an electrical receptacle, adjacent the second surface of the housing, for receiving an electrical plug of an adjacent heat transferring apparatus.

A preferred apparatus for positioning a heat transfer element in a heat transfer supporting device of a chamber comprises a tapered wedge-like surface, inserted between a side wall of the heat transfer element supporting device, for moving the heat transfer element towards its desired position and a portion, preferably flattened, disposed directly adjacent and above the tapered wedge-like surface, for holding the heat transfer element in its desired position in the heat transfer element supporting device. A preferred template can be disposed on at least one projection of a heat transfer element for releasably positioning a center of each container of food directly above at least one heat transferring surface.

Another preferred aspect of the present invention includes a device, disposed on the frame and external to the chamber, for connecting the apparatus to a receptacle of an external power source. The connecting device includes a plug and a rubber-like grommet disposed about a fastener for adjusting the plug position as the plug mates with the external power source receptacle.

An apparatus for adjusting the height of a plurality of vertically oriented shelves in a housing enables the plurality of vertically stacked shelves to be accessed from substantially the same height. A preferred method comprises the steps of locating the housing in a desired position adjacent to an assembly line and moving the housing vertically so that a shelf originally below the height of the assembly line is raised to a height at least as high as the height of the assembly line.

Another aspect of the present invention relates to heating by both conduction and convection including a chamber for heating a plurality of heat transfer elements in the chamber and a surface-like portion, inside the chamber and disposed above and adjacent but not in contact with containers of food to be heated, for directing heated air in the chamber towards a subjacent removable container of food. It is preferred that the surface-like portion which directs heat to a subjacent container be integral with the device for supporting heat transfer elements. Heating by conduction and convection provides the combined advantage of a shortened cooking time and higher quality food (less dryness and less likelihood of scorching the bottom of the food).

With respect to improving insulation, minimum chamber to frame contact is obtained with a chamber having projecting portions extending outwardly from the chamber and a frame-like structure for supporting the chamber. This frame-like structure is in contact with the chamber at the chamber projecting portions only.

A food storage apparatus for maintaining food in a container which is disposed inside a chamber and on a container supporting element at a desired temperature while a portion of the same container supporting element is disposed outside the chamber includes a plurality of substantially horizontal parallel spacer bars. Each spacer bar is disposed across on open portion of the chamber and defines a plurality of apertures. In addition, a device for supporting a plurality of containers of food is removably received in one of the apertures. This supporting device has a closed position when all the container on the supporting element are in the inner side of the chamber and the chamber is substantially sealed from ambient air. The container supporting device is disposed sufficiently close to a bottom of an adjacent upper spacer bar to minimize the amount of ambient air which contacts food in the container which is located within the chamber when the container supporting device is not in a closed position and a portion of this same container supporting device is disposed outside the chamber.

It is also preferred that the drawer include a front wall disposed outside the bars. A seal is then preferably mounted on the interior of the front spacer wall of the drawer which contacts at least one of the bars when the drawer is in a closed position.

A further aspect of the present invention includes waterproof connections between the chamber, the drawer and the heating elements. This preferred chamber includes waterproofing elements disposed adjacent to a chamber terminal, for preventing fluid which is adjacent an accessible inner side portion of the terminal from leaking outside of the chamber. A male connector, disposed in the heat transfer element, includes an electrical prong projecting from the first wall of the heat transfer element housing and a seal for enabling an electrical coupling with said prong even in the presence of fluid on the prong. A female connector, disposed in the heat transfer element, also includes a receptacle adjacent the second wall of the element housing for receiving an electrical prong of an adjacent heat transfer element and a seal for enabling an electrical coupling with the receiving means even in the presence of fluid in the prong receiving receptacle. A power distribution conduit of the supporting device includes a receptacle for receiving an electrical prong of the heat transfer element and a seal for enabling an electrical coupling in the presence of fluid in the receiving receptacle of the power distribution conduit receptacle.

Various advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof and to the accompanying descriptive matter, in which there is illustrated and prescribed embodiments of the invention.

BRIEF DESCRIPTION OF THE DRAWINGS

FIG. 5 is a perspective view of the work station and operator station of FIG. 4;

FIG. 6 is a rear view of the work station of FIG. 4;

FIG. 35 is a side sectional view of a portion of the chamber of the food service apparatus.

DETAILED DESCRIPTION OF THE PREFERRED EMBODIMENTS

Food Service Apparatus and Process Introduction

Figure 2:
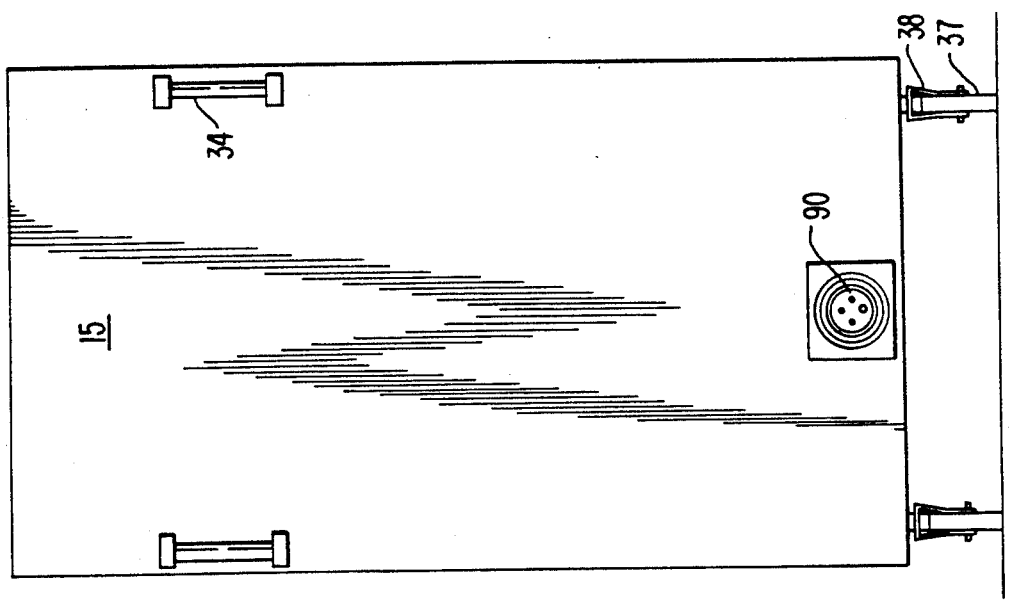
FIG. 2 is a rear view of the food service apparatus of FIG. 1.

Referring to the drawings, wherein like numerals indicate like elements, there is illustrated a food service apparatus and process.

Figure 1:
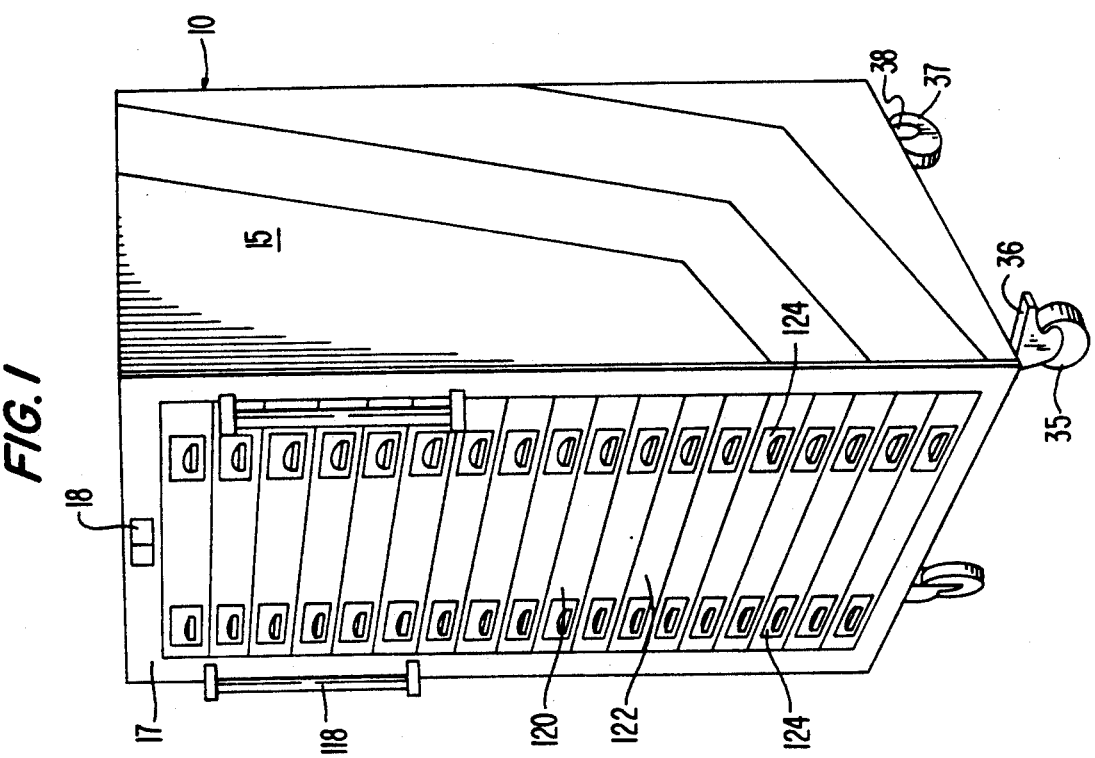
FIG. 1 is a perspective view of a food service apparatus in a portable mode including a housing having drawers with a front facia about the drawers and a skin about the remainder of the housing.

FIG. 1 is a perspective view of a preferred service food service apparatus which can be used at least for food preparation and/or food storage. FIG. 1 includes housing or apparatus 10 having eighteen removable shelves or drawers 120, front facia 17 about drawers 120 and skin 15 about the remainder of housing 10. Housing 10 is a container carrying enclosure or a cabinet which is preferably well insulated to reduce any heating load on a power supply to the housing. Having skin 15 and front facia 17 on housing 10 improves insulation, but it also provides a surface which can be touched after heating, to reduce the need for hot pads and gloves in handling the housing.

The skin 15 is preferably one piece of material about the top and sides of the housing. It can be painted to any desired color or design. The optional front facia 17 also hides screws which attach handle 118 to the housing. Handle 118 is for the convenience of the operator when the operator is transporting housing 10 and when the operator is inserting the housing into a work station enclosure to be discussed herein. Also, light 18 has two lenses, one green and one red for indicating the presence or absence of power to the housing interior.

The vertically arranged shelves or drawers 120 are included for supporting and for accessing removable heater elements. Drawers 120 are also for distributing power to these same removable heating elements. Each drawer 120 includes front wall 122 having a plurality of handles 124 on the front exterior. Each drawer or shelf 120 is preferably made of aluminum and coated with a protective oxide.

Each drawer 120 of the preferred embodiment is completely removable and rectangular in shape. By being completely removable the drawer is relatively easy to clean manually or in a dishwasher.

Housing 10 of FIG. 1 is portable with front and rear wheel caster 35 and 37 attached to steerable and lockable elements 36 and 38 for pivotally connecting the wheels to housing. These elements facilitate easy rolling and maximum maneuverability. When this housing is made portable it can be used, for example, to cook large numbers of meals for airlines, hospitals, prisons, nursing homes, caterers, hotels or other institutions. If this housing is used in a stationary mode it can be used for the above-mentioned applications and also for convenient stores and the like.

FIG. 2 is a rear view of the food service apparatus of FIG. 1 with handles 34 on the rear of the housing for steering the cart. Also shown in FIG. 2 is male connector 90 which connects to a power source to be discussed herein.

Housing Height Adjustment System

Figure 4:
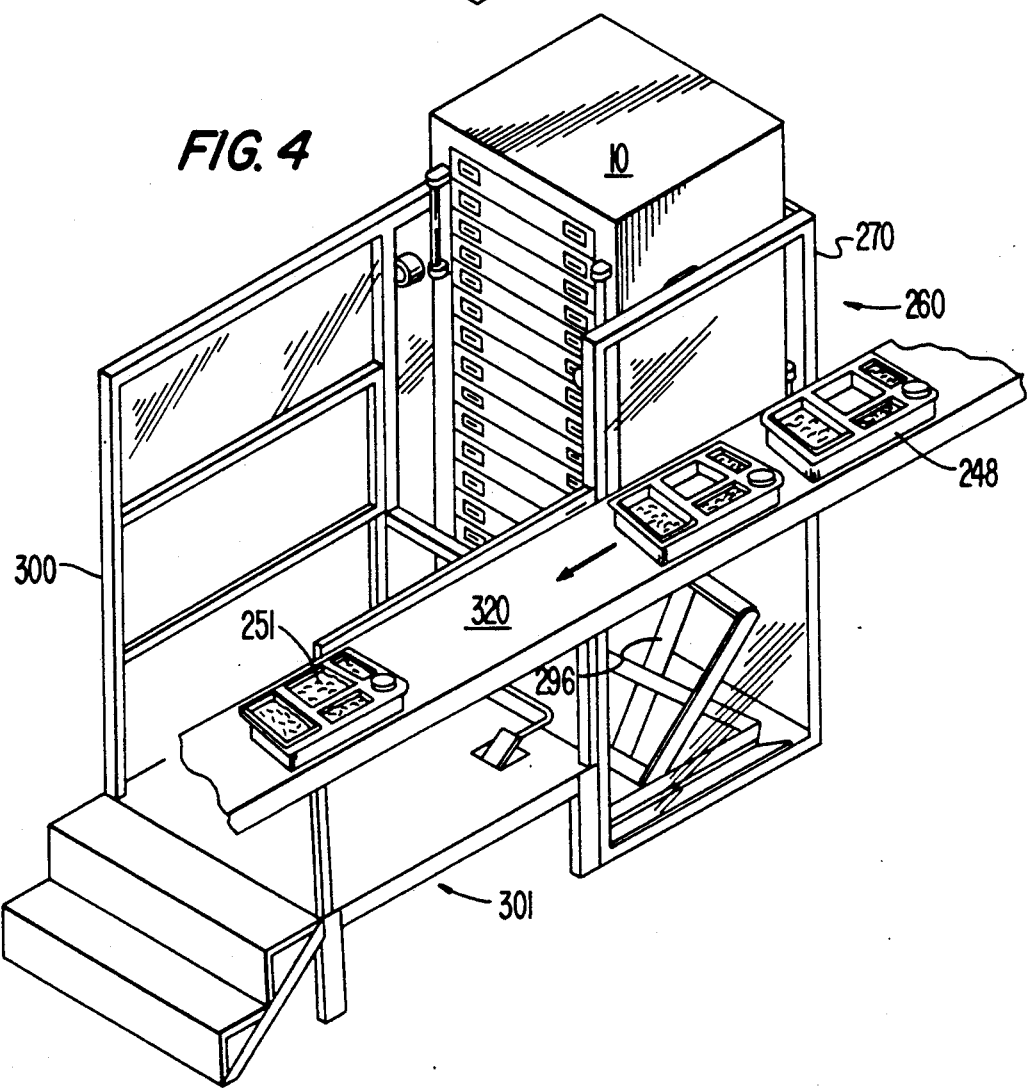
FIG. 4 is a perspective view of the food service apparatus of FIG. 1 within a work station and an adjacent operator station and assembly line.

FIGS. 4-6 are directed to a housing height adjustment system used to adjust the height of a plurality of vertically oriented shelves or drawers 120 in housing 10 so that containers of food in the plurality of drawers can be accessed by an operator from substantially the same height or position. Housing 10 has a plurality of vertically stacked drawers 120 which are slidably disposed in housing 10 for receiving containers of food. Each one of the plurality of drawers 120 provides separate access to housing 10.

As illustrated in FIG. 4, one locates the housing in a desired position adjacent to an assembly line 320. On this assembly line 320 are food serving trays 248. Before reaching housing 10, trays 248 have a gap for receiving hot food. As serving tray 248 passes the housing, container 250 with heated food 251 is placed on tray 248 for completion of the serving tray.

Adjacent the assembly line is a work station enclosure 260. While housing 10 is within this work station enclosure 260, one can move the housing 10 vertically so that a drawer 120, which is originally below the height of assembly line 320, can be raised to a height at least as high as the height of the assembly line. Therefore, each of the shelves can be accessed from substantially the same height or position. An advantage in the meal preparation process resides at least in the fact that an operator does not have to waste the extra time of bending down for containers of hot food in lower drawers.

The height adjustment system illustrated in FIGS. 5 and 6 uses lift 290 disposed adjacent housing 10 to lift housing 10 preferably up to three feed in height. Lift 290 includes platform 292 disposed underneath housing 10. Lift 290 also includes arm 294 and shock absorbers 296 for lifting the platform vertically. It is contemplated that the complete housing will be raised and lowered and that the vertical relationship of the drawers to each other will not change.

In operation, it is preferred to first raise the housing up for providing access to the lowermost shelf. Then one can empty the containers in the housing in order from the lowermost shelf to the uppermost shelf. In other words, one moves the lowermost shelf vertically upward to a height which is within the range of motion of an arm of an operator who is standing upright and then one continues to lower the housing to access additional shelves or drawers. Since the heated air rises in the cart, emptying the housing from the lowermost shelf first to the uppermost shelf last minimizes the amount heat which can possibly escape the housing.

By using drawers for providing separate access to different groups of heater elements, the insulation of the chamber is improved. In contrast with the use of a door, the inside of the whole chamber is exposed when one first begins to unload containers.

The uppermost shelf does not have to be lowered as far down as the height to which to the lowermost shelf was raised. The uppermost shelf should be, however, within the range motion of an arm of an operator who is standing upright. A means for accomplishing this function is to add operator station 301 disposed adjacent housing 10. Operator station 301 includes a substantially horizontal non-skid platform 302 for an operator to stand on to reach the uppermost drawer. This operator station 301 of FIG. 5 also includes safety frames 304 and 306 having protective shields of 305 and 307. In addition, it includes stairs 308 for access to substantially horizontal platform 302. With this added operator platform 301, in combination with the vertically aligned drawers, the operator can reach for and obtain each of the containers of food in the uppermost shelves in less time for a faster meal preparation process. Also, with the addition of operator station 301, in combination with the height adjustment system, the number of vertically oriented shelves can be increased upward and downward for receiving additional containers of food in the housing. Preferably, the housing receives eighteen vertically arranged drawers.

To prevent an operator's foot from getting caught between operator station 301 and drawer 120 extending outwardly and moving downwardly, limit switch 309 can be added. Limit switch 309 can be used for stopping the downward movement of housing 10 when one of drawers 120 of the housing is extending outwardly from the housing and this outwardly extending shelf drops below a predetermined vertical in height. In FIG. 5, the predetermined vertical height where the switch will be triggered is at a top of a protective shield 312 between operator station 301 and lift 290. Limit switch 309 includes a microswitch and a lever to sense contact with an outwardly extending drawer.

Also included is foot pedal 310 for controlling the height adjusting lift. The limit switch 309 can, however, prohibit the downward movement of housing 10 even if the height controlling foot pedal 310 is directing the housing to move downward. Foot operated controls of lift 290 are preferred, because the operator's hands will likely be busy with the container unloading process. However, hand operated controls or other equivalent controls could be used. A partial cover (not shown) over the foot pedal 310 is also preferred to avoid accidental activation of the lift controls.

Work station 260 also provides for protection of adjacent people and equipment during the operation of the height adjusting system. Work station 260 of FIGS. 4-6 includes guide rollers 279 disposed about portions of the housing for stabilizing the vertical positioning of housing 10 during adjustment (i.e., the raising or lowering) of housing 10. Guide rollers 279 are disposed on frame 272. Frame 272, which partially encapsulates the housing, should be of sufficient strength to support a housing which may be leaning against guide roller 279. Also on frame 272 is door 278 where the cart enters work station 260, floor slots 273 for aligning wheels of the housing so that the housing is properly placed over the lift and protective shields 274, 276 and 280 of lexand.

As illustrated in FIGS. 1, 2 and 4 and as will become clear from the subsequent discussion, the preferred food service apparatus and method substantially saves numerous steps which occur under current procedures for preparing foods for placement, for example, on airline trays. The similified procedure can include the steps of placing the frozen meals to be heated on drawers 120 of housing 10, activating a timer, heating the food to a temperature between 180° and 200° F., physically transferring the complete housing 10 to a position in work station enclosure 260 which is adjacent assembly line 320, adjusting the level of the housing drawers relative to the operator, removing the containers 250 of hot food from housing 10, assembling hot food containers 250 onto serving trays 248, and applying insulated covers to the trays. This streamlined procedure could possibly eliminate over 60% of the time involved in the current food service handling procedures. Consequently, with less food preparation time and less steps, the present invention allows for more efficient scheduling of production.

Supplying Power to the Chamber

Figure 8:
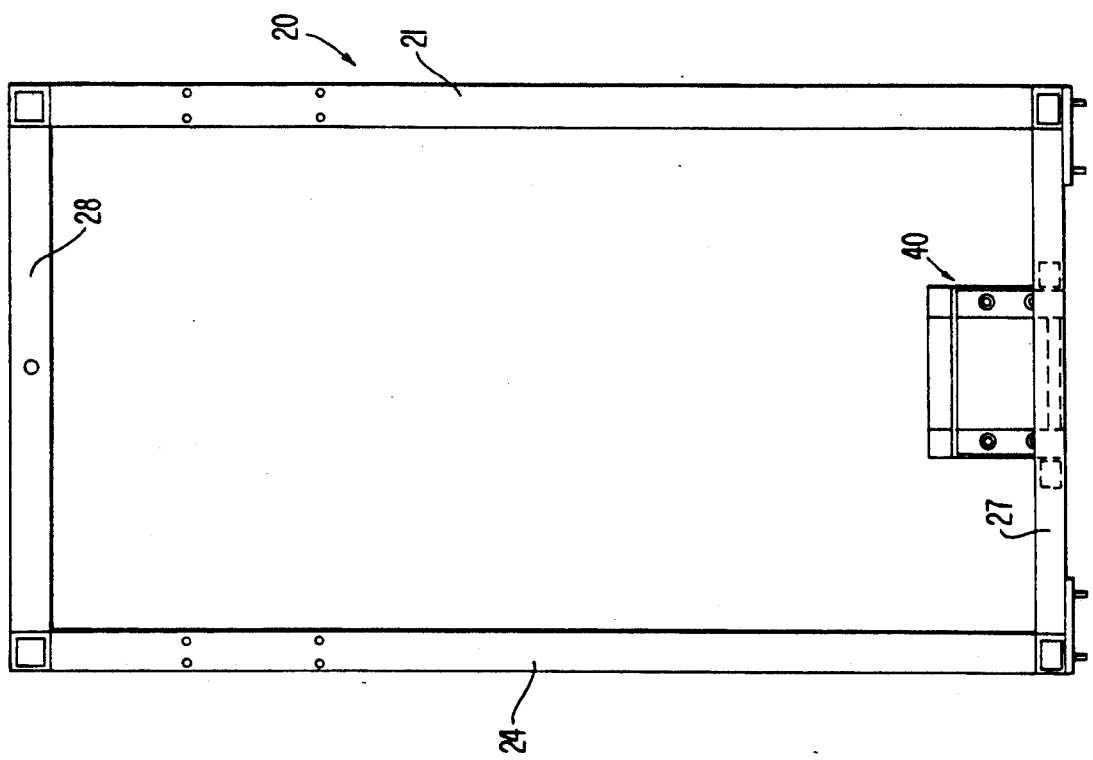
FIG. 8 is a front view of the frame of FIG. 7.
Figure 7:
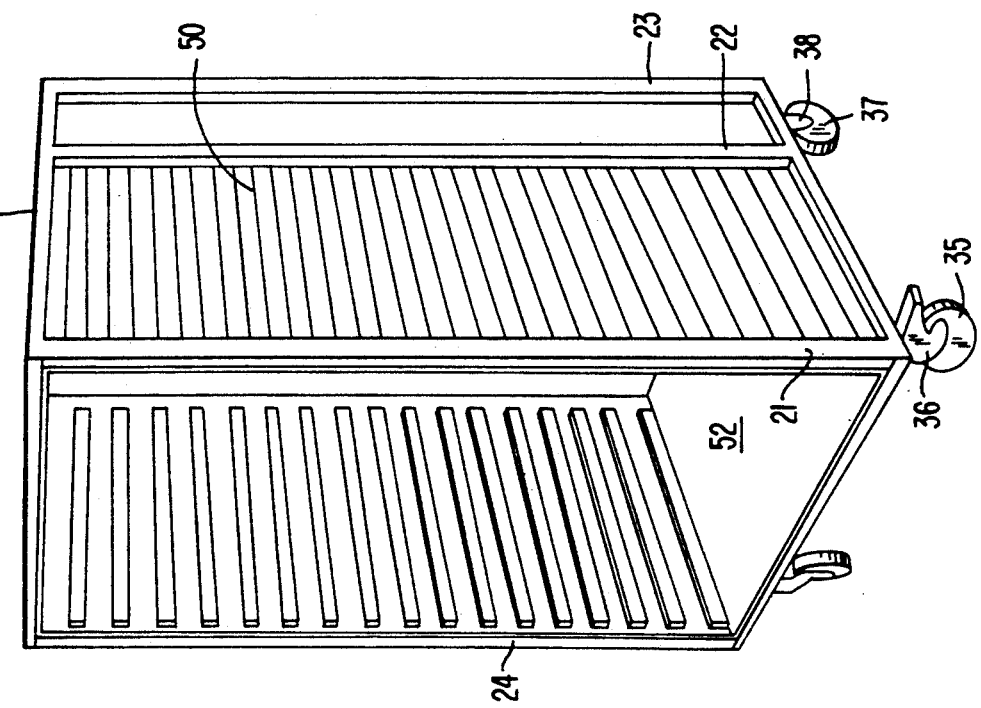
FIG. 7 is a perspective view of a frame and of a chamber within the frame of the food service apparatus of FIG. 1.
Figure 10:
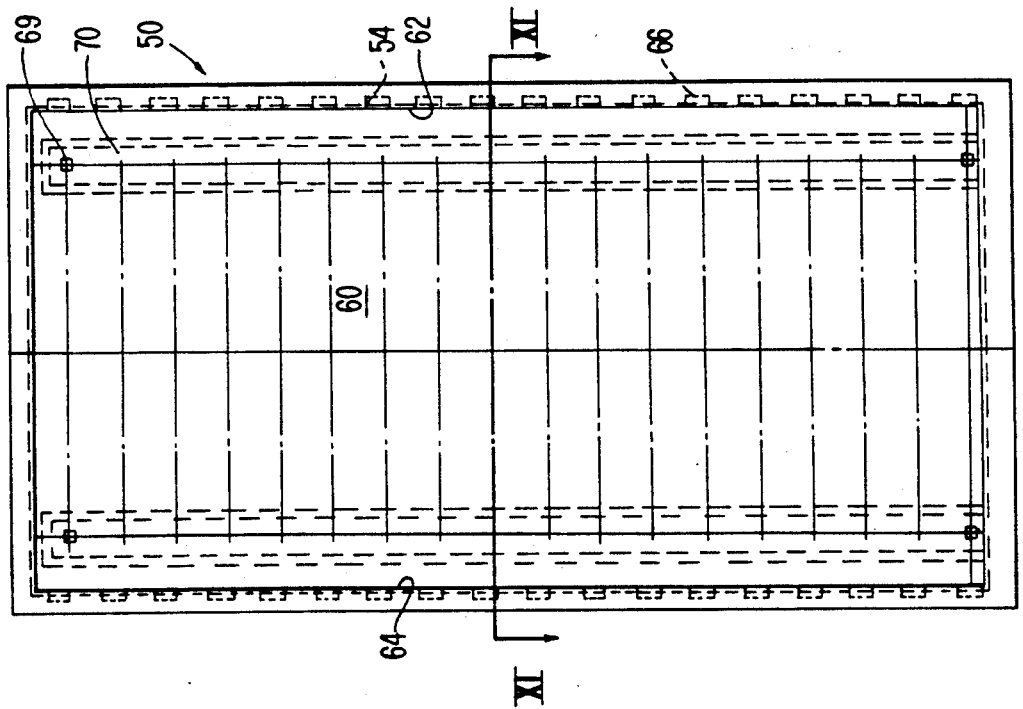
FIG. 10 is a front view of the chamber of FIG. 7.
Figure 9:
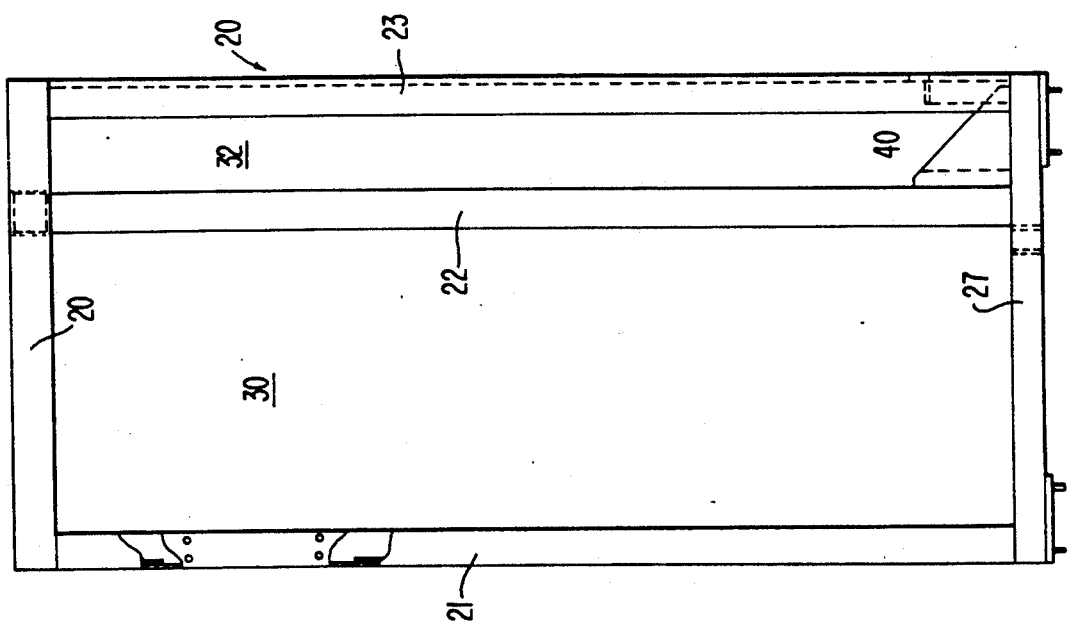
FIG. 9 is a side view of the frame of FIG. 7.

FIGS. 7-15 illustrates a preferred frame 20 and chamber 50 for housing 10 as well as the electrical system for bringing power to inner side 52 of the chamber. As illustrated in FIGS. 7-9, frame 20 includes columns 22 and 23 partially defining (2 of 4 columns shown) an area 32 for receiving electrical elements and includes columns 21, 22 and 24 partially defining (3 or 4 columns shown) an area 30 for receiving chamber 50.

Figure 13:
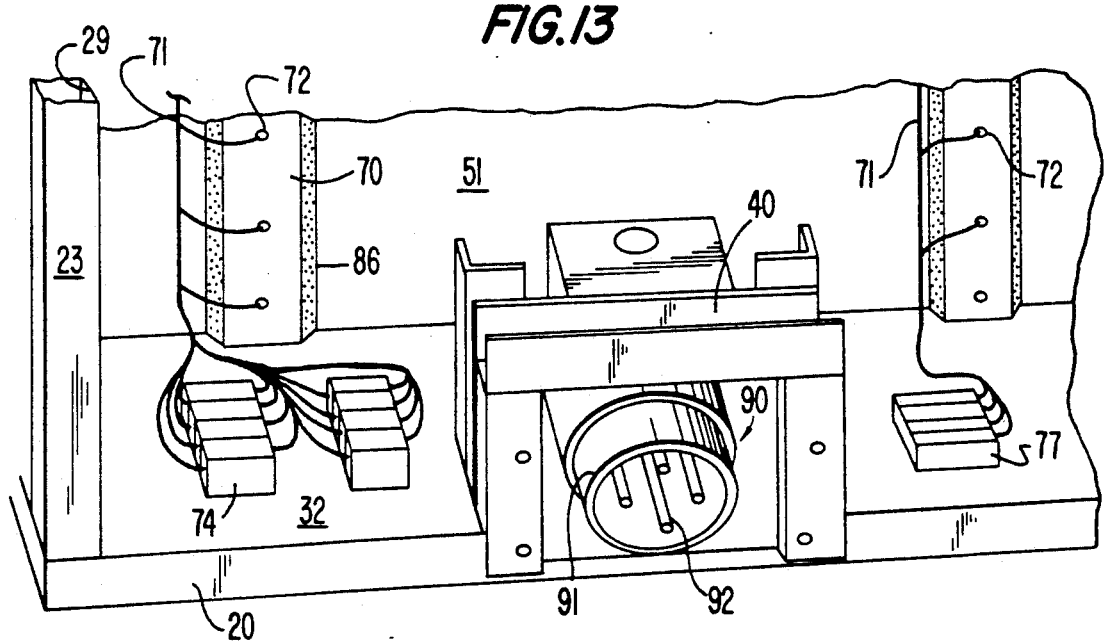
FIG. 13 is a partial perspective view of the lower portion of the apparatus of FIG. 12 including a power connector.
Figure 14:
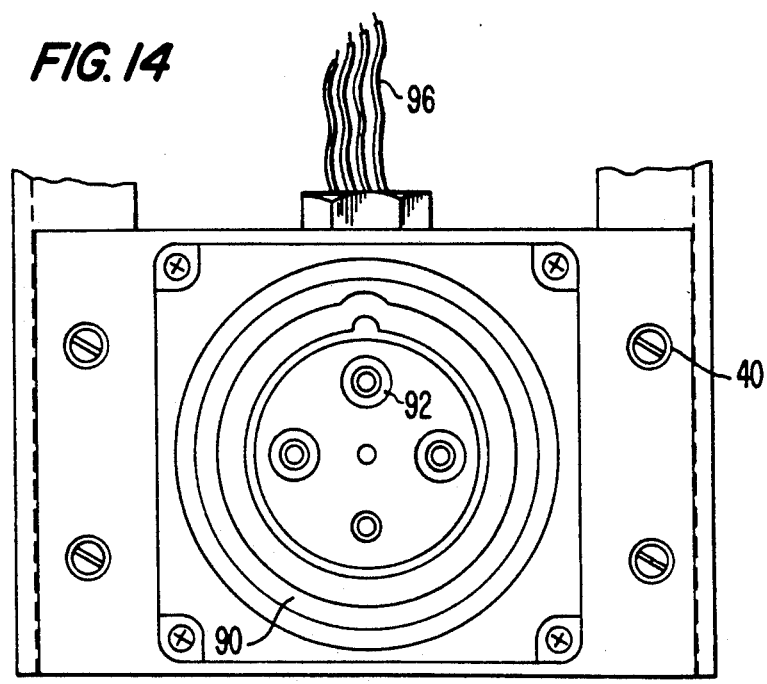
FIG. 14 is a partial front view of the power connector and associated enclosure of FIG. 13 with elements removed for clarity.
Figure 15:
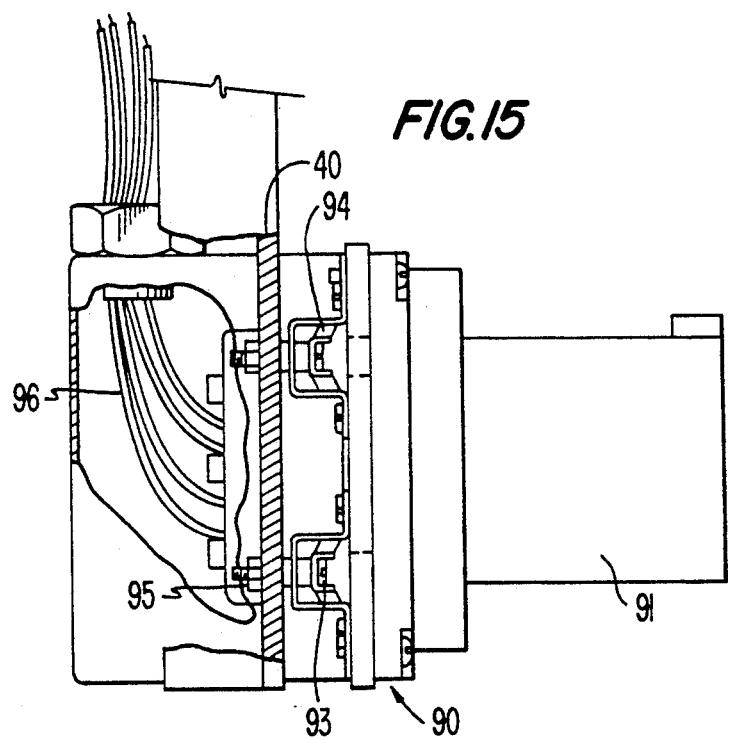
FIG. 15 is a partial sectional side view of the power connector and associated enclosure of FIG. 13.

Included in the electrical element receiving portion 32 of frame 20 is enclosure 40 for receiving male connector 90. Male connector 90, shown in FIGS. 2, 12-15 and 33, is disposed in frame enclosure 40 and is external to chamber 50. Male connector 90 connects apparatus or housing 10 to a female receptacle of an external power source. As shown in FIGS. 13-15, this male connector 90 is shrouded with ring 91 for locking this male connector to a female receptacle of an external power source. As illustrated in FIGS. 13 and 14, a plug 92 having four prongs is included on connector 90. As illustrated in FIG. 15, fasteners attach male connector 90 to enclosure 40. Preferably, a nut 95 and a bolt 93 are used as fasteners. FIGS. 14 and 15 also illustrate wires 96 extending from male connector 90.

In FIG. 15 is a rubber-like grommet 34, having an eyelet, for adjusting the position of plug 92 and plug 92 mates with an external power source receptacle. With this adjusting structure one can move plug 92 approximately three-sixteenths inches in any direction to accommodate, for example, differences in the compression of wheel casters 35 and 37 and steerable elements 36 and 38. The plug 92 will not be free-floating, however, because the present adjusting structure is also designed to eliminate bouncing and noise between the frame enclosure 40 and power source connector 90. Consequently, this rubber-like grommet is disposed about fasteners 93 and 95 to provide some tolerance for a relatively smoother engagement between male connector 90 and an external power source.

Figure 12:
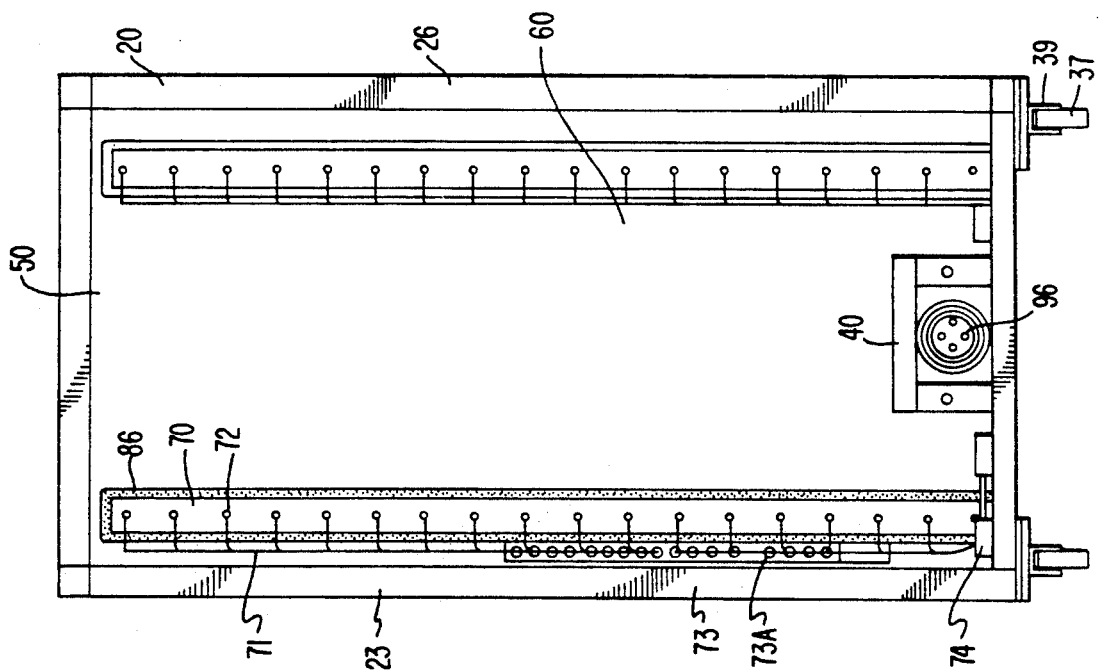
FIG. 12 is a rear view of the food service apparatus of FIG. 1 with the skin removed.
Figure 11:
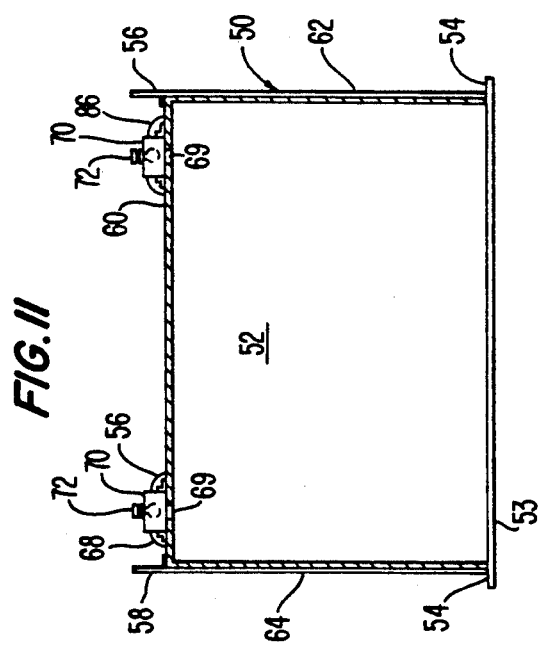
FIG. 11 is a sectional view along line XI—XI of FIG. 10 including a pair of electrical panels mounted on the chamber rear wall.

As shown in FIGS. 11 and 12, chamber 50 includes two electrical panels 70 which are preferably plastic solid tubes. Each panel can be separate or integral with the chamber. If the electrical panel was integral with the chamber, a chamber wall could include the panel elements to be discussed herein. If the panel is a separate element, flange 68 is used to secure panel 70 to chamber 50. A bead of silicone seal 86 is also used for sealing the engagement between a separate electrical panel 70 and chamber 50. For supplying power to the heating elements, chamber 50 has aperture 69 in the rear walls as in FIGS. 10 and 11.

Figure 33:
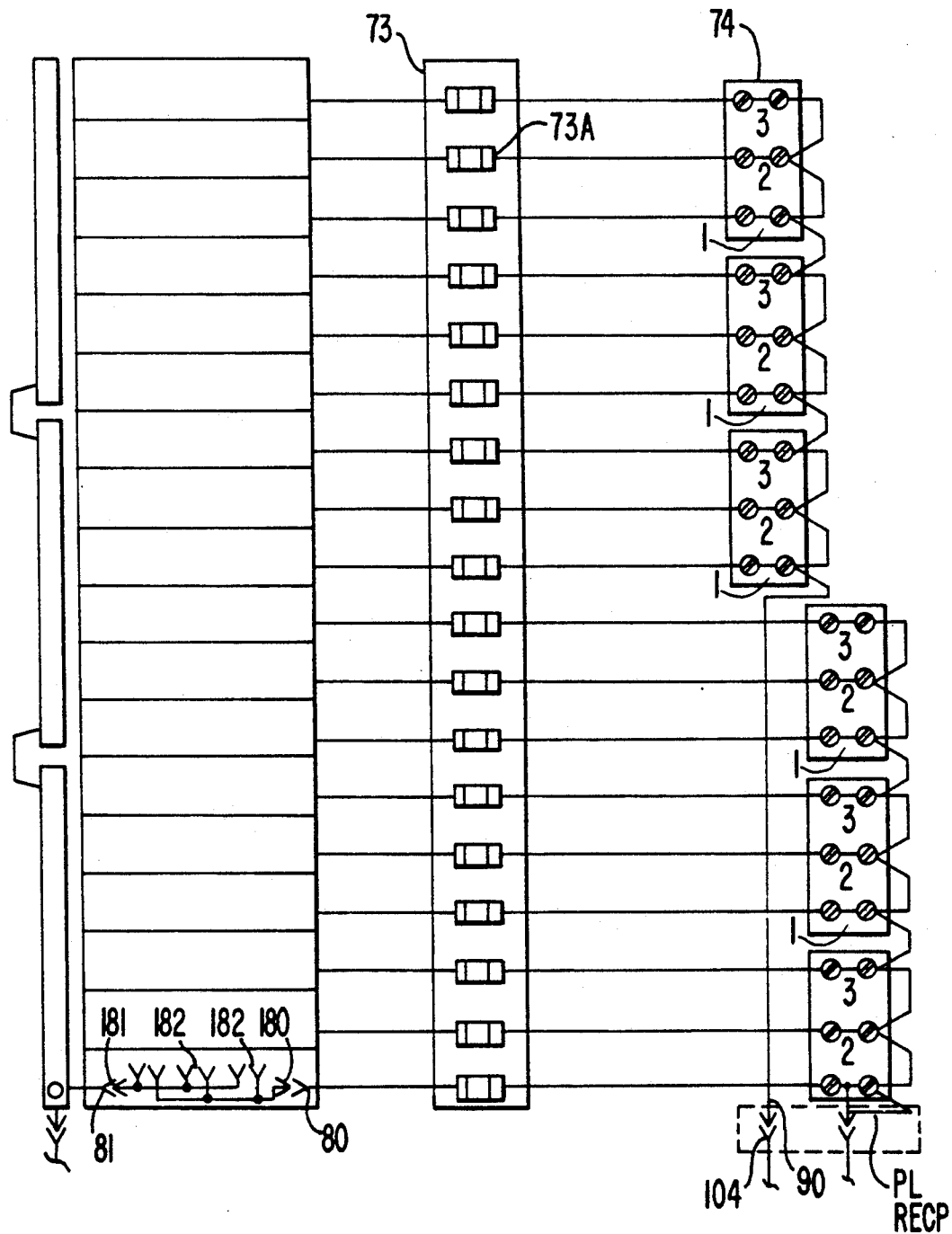
FIG. 33 is a partial wiring diagram of the food service apparatus.

First and second terminal blocks 74 and 77 of FIG. 13 are connected to wires 96. As shown in FIGS. 12, 13 and 33, wires 71 and fuses 73A of fuse block 73 then complete the connection of one line of service to each of a plurality of terminals 72 of electrical panel 70. A pair of terminals 72 of each circuit are placed greater than twenty inches apart (preferably thirty inches apart) in separate electrical panels for limiting the opportunity of an unsafe accidental completion of the circuit.

Figure 3:
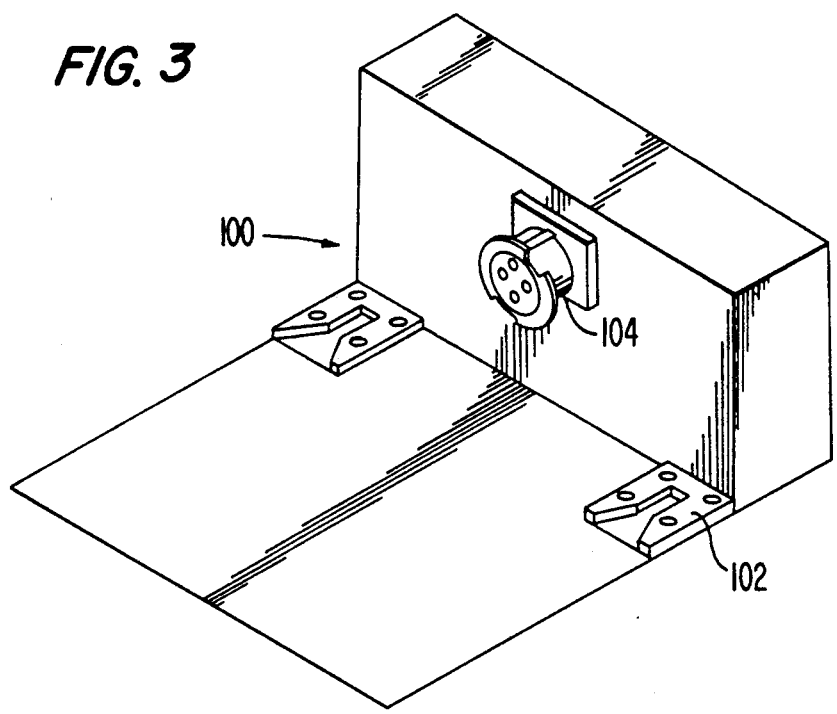
FIG. 3 is a perspective view of power source for the food service apparatus of FIG. 1.

Illustrated in FIG. 3 is power source 100 for engaging housing connector 90. This power source provides 2 phase, 4 wire, 220 V, 70 amp service. This power source 100 includes receptacle 104 extending outwardly from the power source and guide elements 102 for receiving rear wheels 37 of the housing for assisting in substantially aligning housing connector 90 with receptacle 104 of power source 100.

A Modular System

The food service apparatus provides the advantages of a modular system with completely removable elements. Chamber 50 of FIG. 7 forms the basis of the modular system. This chamber is preferably for heating only. This heating only condition would include conduction heating and convection heating. Thus, it would include heating to thaw frozen food. A heating only chamber would not, however, include circulating cold air for refrigerating parts of the chamber.

Figure 19:
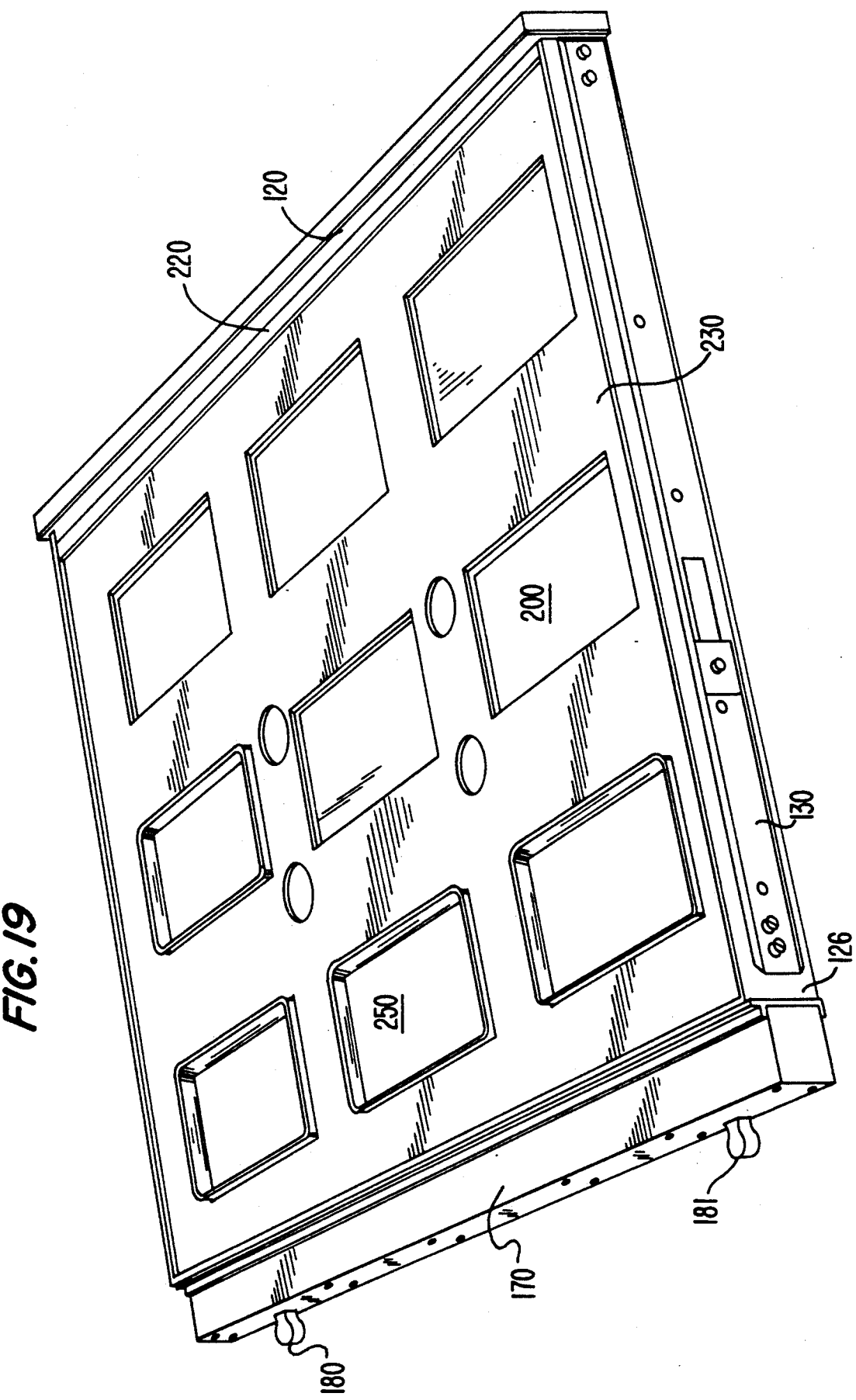
FIG. 19 is a partial perspective view of a drawer, heat transfer elements, a heater positioning shim, a container positioning template and a container of the food service apparatus.
Figure 20:
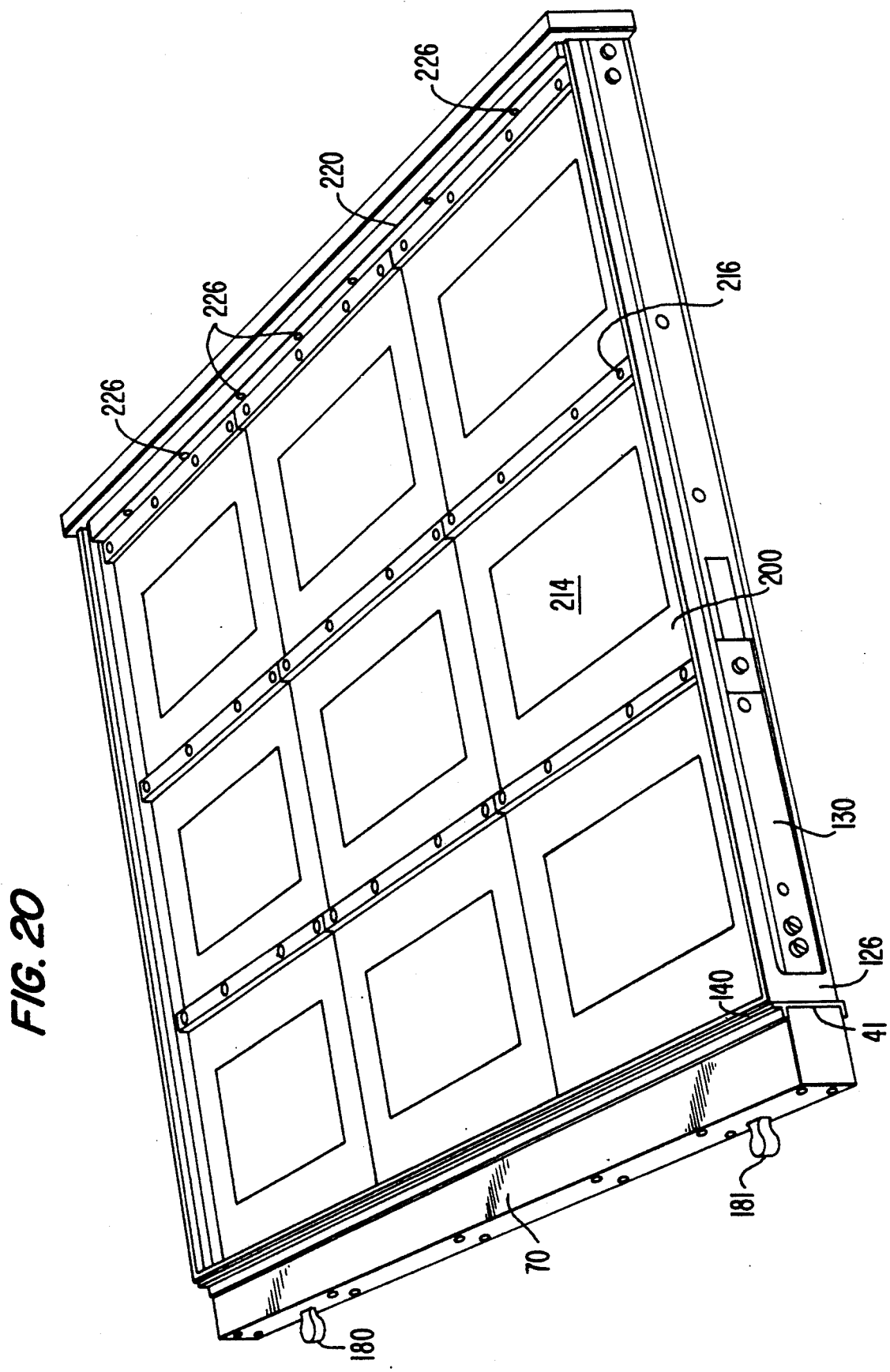
FIG. 20 is a perspective view of the drawer, heat transfer elements and the heater positioning shim of FIG. 19.

Shown in FIGS. 19 and 20 is drawer 120 for receiving and supporting a plurality of heat transfer elements 200. As can be appreciated from FIGS. 19-21, drawers 120 are removable from chamber 50 without the use of tools.

Figure 17:
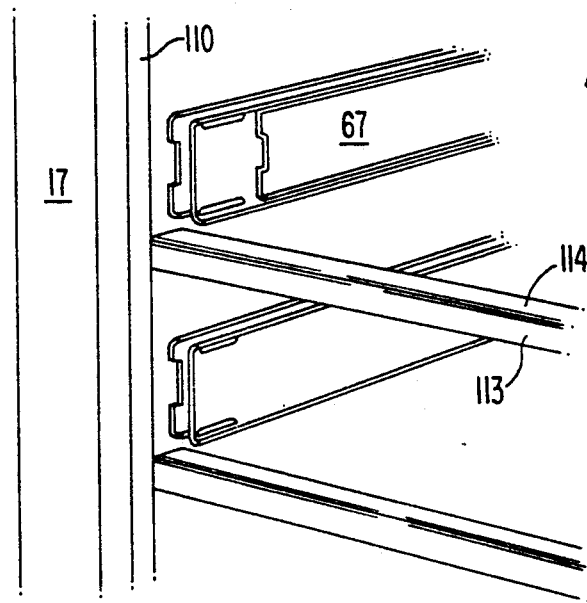
FIG. 17 is a partial perspective view of the front panel of FIG. 16 in combination with the inner side of the chamber and the front facia of the food service apparatus.

As seen in FIGS. 19-22, drawer 120 includes left exterior side 126 and right exterior side 128 (when facing the front of the drawer). The drawer also includes guide rails 130 for sliding the drawers into and out of chamber 50. These guide rails 130 of FIGS. 19-23 are aligned in the chamber on rail aligning elements 67 of FIG. 17. Rail aligning elements 67 are disposed in chamber recesses 66 of FIG. 10. Although these rail aligning elements 67 and guide rails 130 are on the right and left side of the preferred embodiment, it is not necessary to have such guide rails positioned as such or to even have these guide rails so long as the shelf is insertable into the chamber and removable therefrom.

Figure 21:
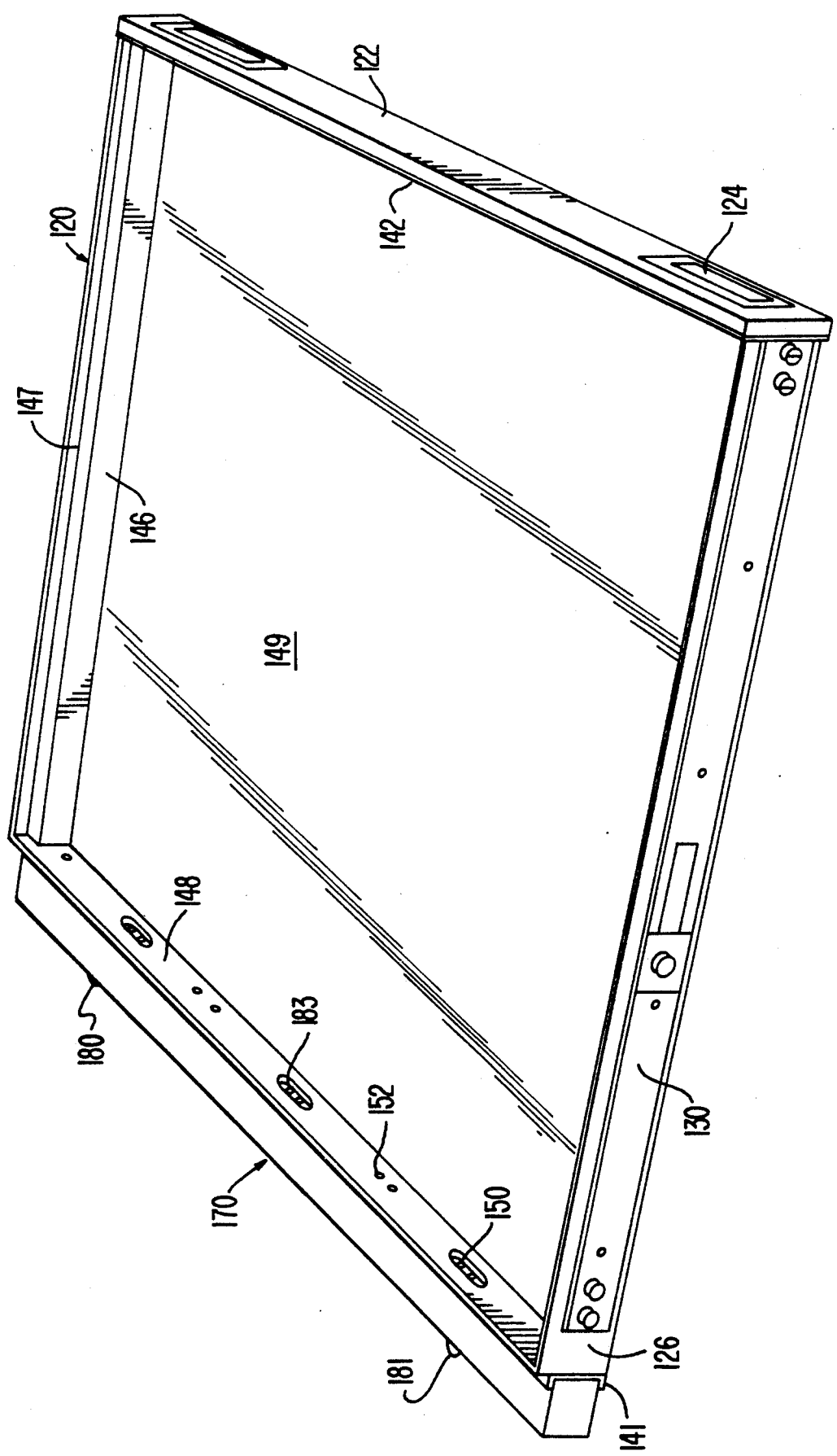
FIG. 21 is a perspective view of the drawer of FIG. 20.
Figure 22:
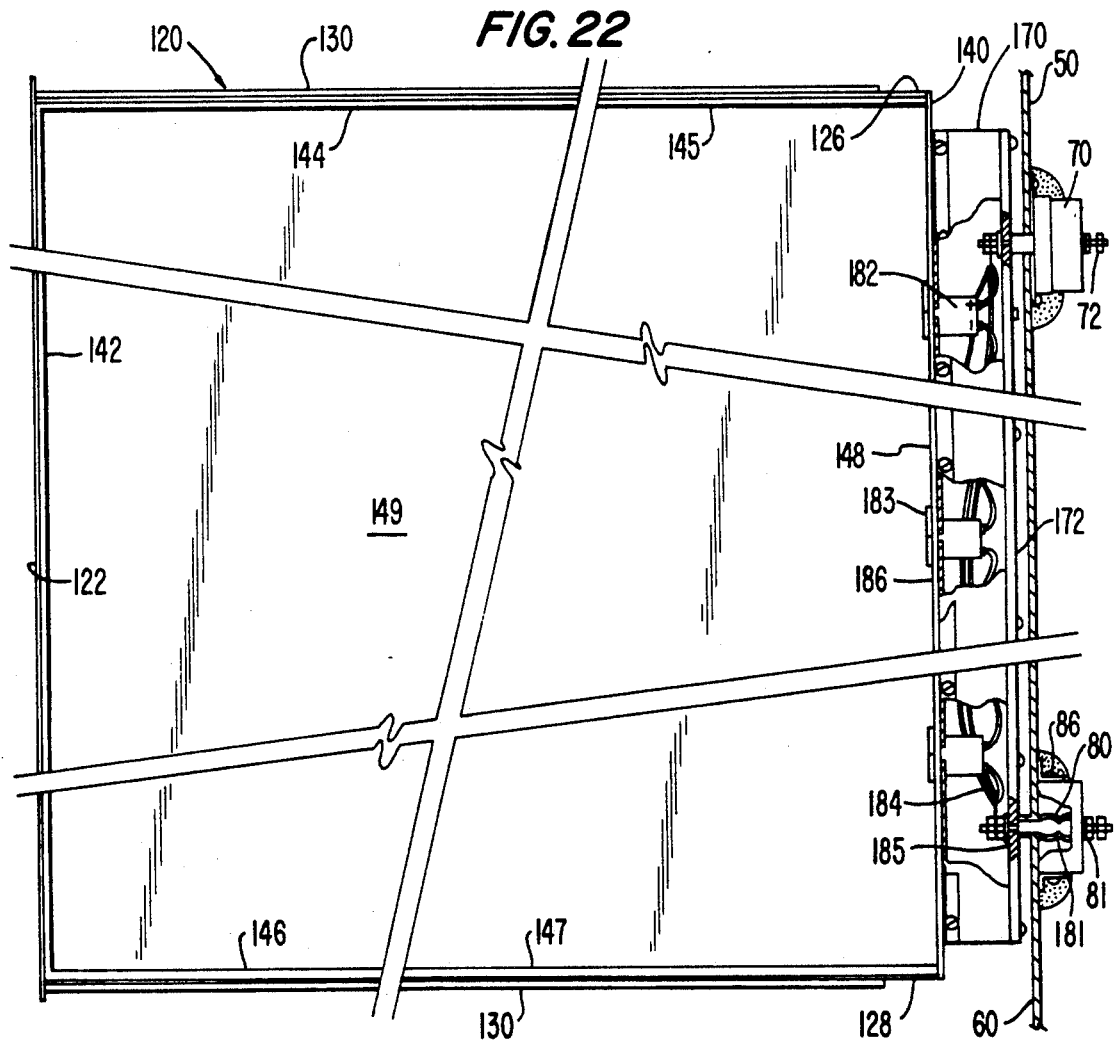
FIG. 22 is a top view of an assembly including the drawer of FIG. 21 in combination with the chamber electrical panels of FIGS. 11 and 12.

Shown in FIG. 22, is left side interior 144 of the drawer having horizontal portion 145. FIGS. 21 and 22 illustrate right side interior 146 which also has a horizontal portion 147. Also shown in FIGS. 21 and 22 is a rear side interior 148 of the drawer. In addition, drawer lower panel 149 (as shown in FIGS. 21 and 22) supports heat transfer elements 200, template 230 and container 250 of FIG. 19. Each drawer 120 removably supports nine heat transfer elements 200.

As shown in FIG. 21, apertures 150 on rear side interior 148 of drawer 120 provide access to a receptacle to be discussed herein. Also in FIG. 21, small apertures or grooves 152 are received in rear side interior 148 for receiving non-electrical projections (to be discussed herein) of a removable heat transfer element.

In the preferred modular embodiment, the power from the chamber runs through the drawer to a removable heat transfer element. By providing power through the drawer, only one electrical connection is needed in the chamber for supplying power to a plurality of heat transfer elements. This provides an advantage in that the chamber can be pressure water cleanable with only a minimum number of electrical connections to waterproof.

The drawer 120 includes power conduit 170. Power conduit 170 is used for distributing power from chamber 50 to at least one of the heat transfer elements 200 supported on the drawer. This power conduit 170 can be integral with the drawer or, as illustrated in FIGS. 20-23, it can be attached on a rear exterior 140 of the drawer by flange 141. This power conduit preferably has a separate cover piece for obtaining access to the electrical components in the conduit and fastener receiving apertures for attaching to the drawer flange 141.

As seen in FIG. 22, power distribution conduit 170 includes a receptacle 182 for receiving a male electrical connector of a removable heat transfer element. A shown in FIGS. 21 and 22, about this receptacle 182 is a molded rubber seal 183.

As illustrated in FIGS. 19-23, a side wall of drawer conduit 170 has projecting prongs 180 and 181 for mechanically and electrically engaging the drawer with the chamber 50. Wires 184 run between and in contact with projecting prongs 180 and 181 and receptacles 182 of the conduit.

Figure 23:
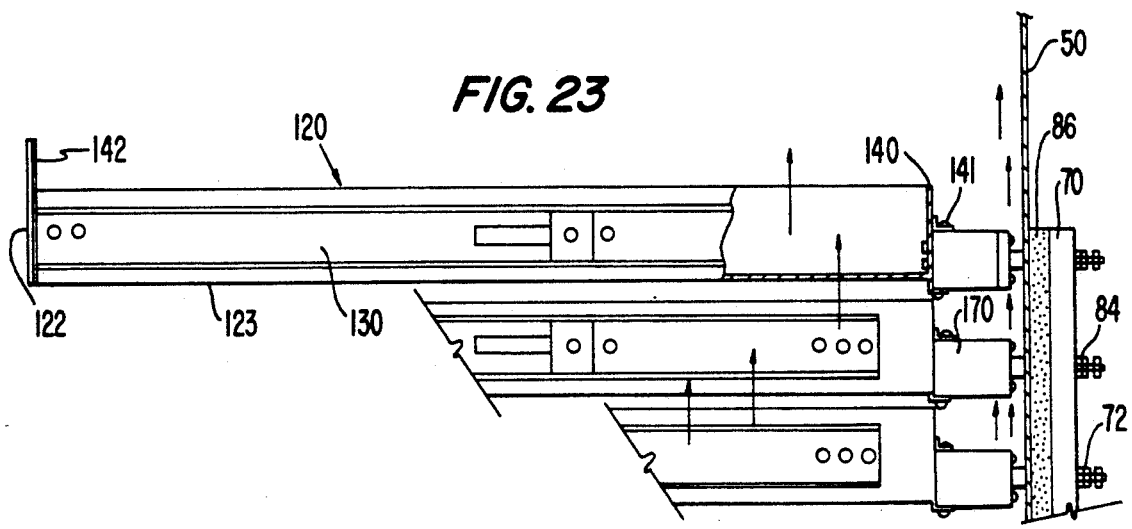
FIG. 23 is a side view of the assembly of FIG. 22.
Figure 24:
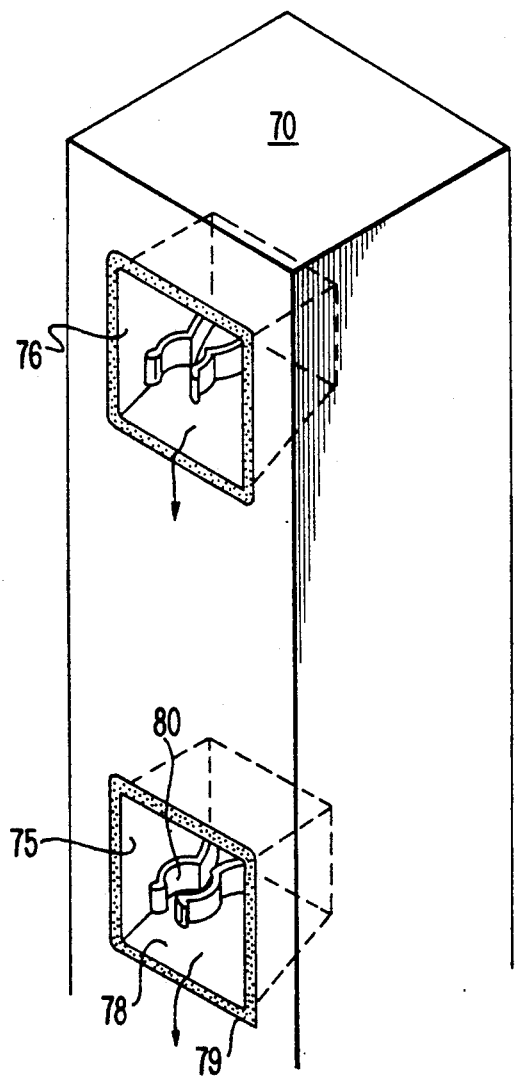
FIG. 24 is a partial perspective view of an electrical panel of FIGS. 11, 12 and 22 and 23.

As shown in FIG. 24, a portion of terminals 72 which is accessible from inside the chamber includes spring clips 80 and 81. As illustrated in FIGS. 19-23 and 33, prongs 180 and 181 electrically connect the drawer to terminal portions 80 and 81. The same drawer prongs 180 and 181 also releasably mechanically engage the chamber 50. Consequently, the drawer electrical connection element and mechanical engagement element are a single unitary element and the drawer will be hard to dislodge from the chamber.

As further illustrated in FIG. 22, portions 80 and 81 of terminals 72 are so sized and shaped so as to be coupled to at least a portion of the prongs 180 and 181 in a snap-type connection. In particular, these prongs 180 and 181 of the removable supporting drawer 120 have distal ends wider than proximate ends and the terminal portions 80 and 81 each define a spring-like clip which is disposed about the wider distal end of the drawer projections 180 and 181. This engagement with the chamber terminal is sufficiently secure to substantially prevent the removable drawer from moving during transport of the complete housing, for example, when transferring the housing to the assembly line. Also, as discussed, each spring-like clip 80 and 91 is recessed in the electrical panel of the chamber for minimizing the exposure of the chamber connector in case the chamber is powered without the drawers being installed.

In operation, it is preferred to have a simultaneous mechanical and electrical drawer to chamber connection in combination with a chamber which is entirely heated. Thus, one would be heating food in a container which is inside a chamber by first loading a container 250 of food to be heated in a drawer 120 which extends outward from the chamber 50. Then, one closes the drawer to simultaneously mechanically engage and electrically connect drawer 120 to power source 80 and 81 in chamber 50. This closing step preferably comprises closing eighteen drawers. One preferably heats the entire chamber until the food in the container is heated from a temperature less than 50° F. to a temperature between 180° and 200° F. Throughout this heating step a top portion of the food remains uncovered.

Shown in FIGS. 25-28 is an apparatus for transferring heat to a container of food and for providing power to an adjacent heat transferring apparatus. As seen in FIGS. 19 and 20, a plurality of removable heat transfer elements 200 are disposed on a shelf or drawer for insertion in the chamber. As shown in FIGS. 19 and 20, a plurality of heat transfer elements on this shelf or drawer are in the same horizontal plane of the chamber.

Figure 27:
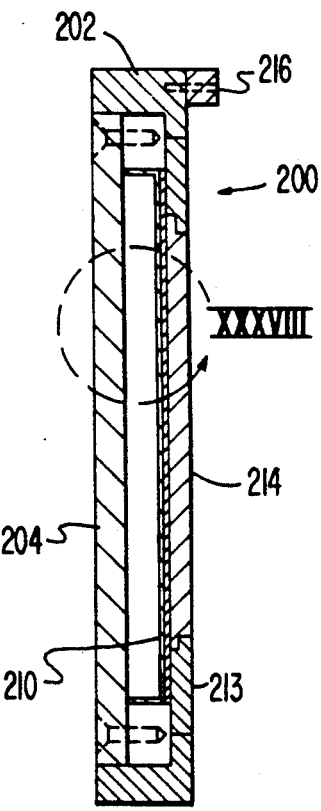
FIG. 27 is a sectional view along line XXVII—XXVII of FIG. 15.
Figure 28:
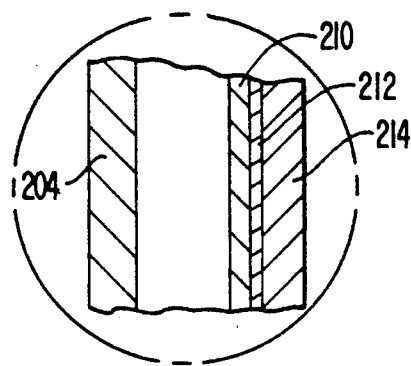
FIG. 28 is an exploded portion XXVIII of the heat transfer element of FIG. 27.

As shown in FIGS. 27 and 28, on this heat transfer element are devices for emitting heat including a heat transfer surface 214 having an area of approximately twenty square inches. Although there are preferably nine separate heat transfer elements loaded onto one drawer, there could be one large heat transferring element on the drawer. This alternative arrangement limits, however, flexibility in cleaning and replacement.

Figure 25:
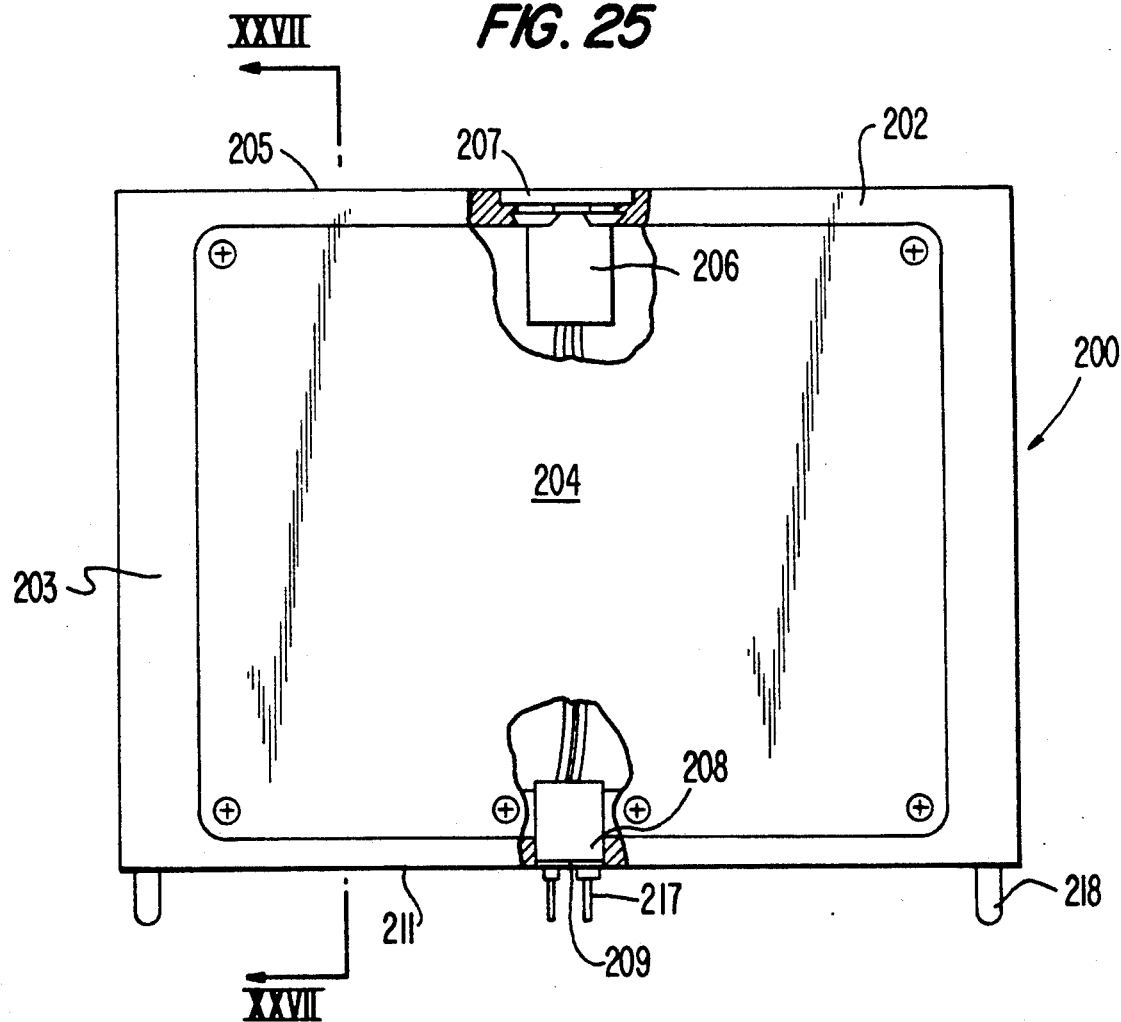
FIG. 25 is a bottom view of a heat transfer element with a portion cut away to illustrate the electrical connectors of the heat transfer element.

Between surface 214 and insulator 210, heater mat 212 of FIG. 28 provides resistance heat to heat transfer surface 214. As seen in FIGS. 25 and 27, heater block housing 202 receives at least a portion of heat emitting elements 212 and 214. This housing 202 is preferably in the form of an insulated block of approximately 8 inches by 6 inches. Also included is cover 204 on the underside of heater block 202 for inserting electrical elements within the heater block. Both heater block 202 and cover 204 are made of thick polypropylene and the height from bottom surface 203 of heater block 202 to top surface 213 of heater block 202 is approximately three-fourths of an inch.

Figure 34:
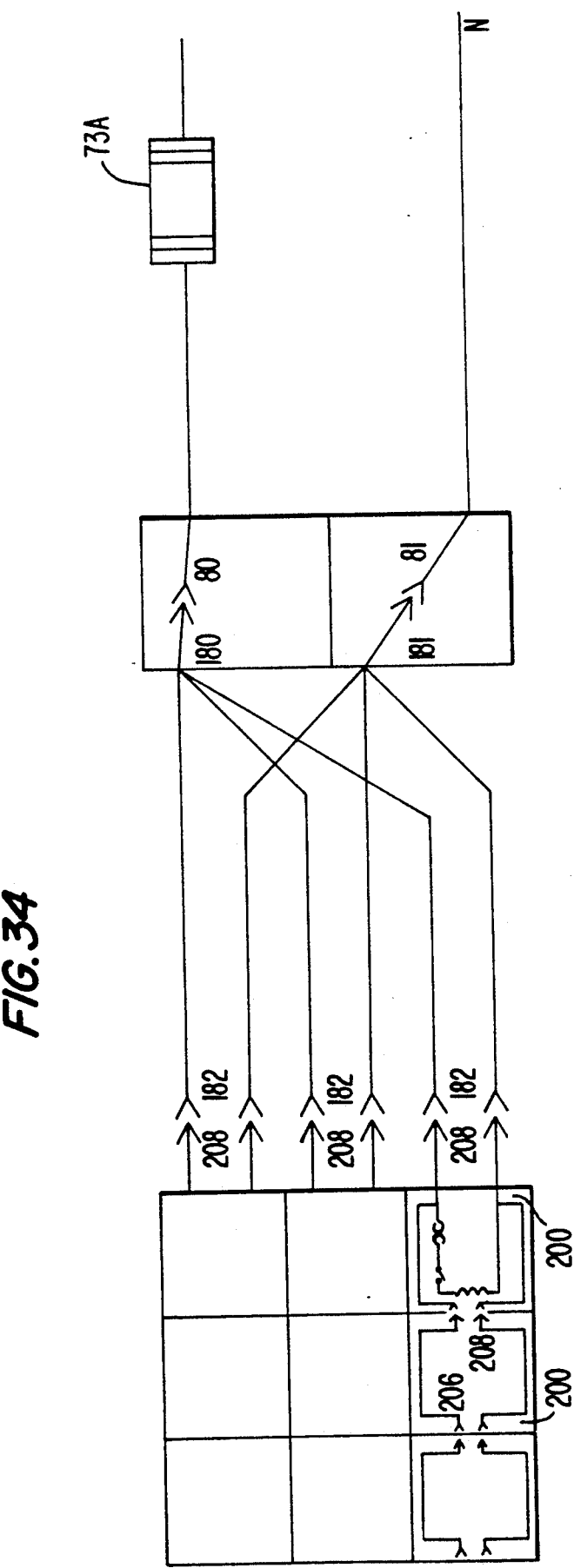
FIG. 34 is a partial wiring diagram illustrating the wiring between the chamber electrical panel connectors and a plurality of heat transfer elements.

Heater block 202 also includes first surface or side wall 211 and second surface or side wall 205 substantially parallel to the first surface. Male connector 208 includes prongs 217 which extend to project from first surface 211 of heater block housing 202. As shown in FIGS. 25 and 34, male connector 208 can releasably electrically connect to receptacle 182 of drawer power distribution conduit 170. This male connector is preferably a Lyall connector Model No. M243. A mechanical prong connection rather than merely contact is preferred to obtain a secure connection to a drawer, because the chamber may be transported frequently with the heat transfer elements left in the chamber.

As shown in FIGS. 19, 20 and 34, a second heat transfer element 200 can be releasably electrically connected to the first heat transfer element. An seen in FIGS. 25 and 26, an electrical receptacle 206 is disposed in heater block 202 and is adjacent second surface or side wall 205 of the heater block for receiving prongs 217 of electrical plug 208 of an adjacent second heat transfer element. In addition, as shown in FIGS. 20 and 34, a third heat transfer element can be releasably electrically connected to the second heat transfer element. The electrical receptacle 206 of a heat transfer element is electrically serially connected to the electrical plug 208 of the same heat transfer element so that three heat transfer elements are preferably connected in series with each other. An advantage of allowing adjacent removable heating elements to electrically interconnect to each other is that the number of heating elements on a drawer can be increased without having to add a large number of electrical connections to the drawer or to the chamber. Thus, the removable drawer and the chamber can be pressure water cleanable with only a relatively few connections which must be waterproofed.

Figure 26:
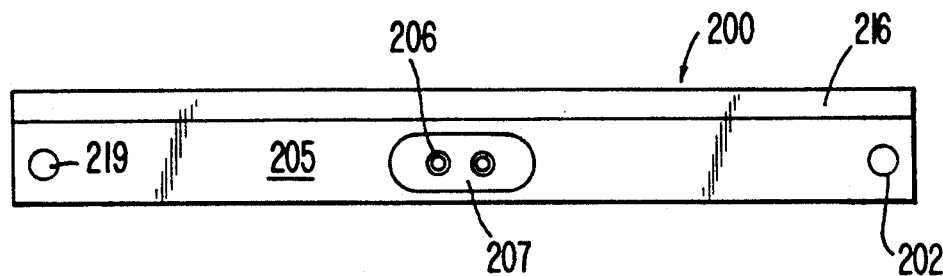
FIG. 26 is a side view of the heat transfer element of FIG. 25.

The heat transfer element 200 can also include dowel pins 218 for preventing bending of prongs 217 on male connector 208. As illustrated in FIGS. 25 and 26, dowel pins 218 preferably constitute at least two projections extending from first side wall 211 of the heater block housing and separated by prongs 217 of male connector 208. In addition, these projections are spaced sufficiently far apart to substantially prevent prong 217 of the electrical connector from being bent upon connection to electrical receptacle 182 of drawer conduit 170 or to electrical receptacle 206 of an adjacent heat transfer element. These pins 218 can also be used as electrical contacts, for example, for grounding.

As illustrated in FIGS. 26, two grooves 219 are placed on a second side wall 205 of heat transfer element 200 for mating with pins 218. Both pins 218 and grooves 219 are spaced sufficiently far apart to substantially prevent electrical prongs 217 from being bent upon connection to an electrical receptacle 206. As in seen in FIGS. 25 and 26, the heat transfer element male electrical connector 208 and mechanical engagement pins 218 are preferably separate and distinct elements 206. While the preferred arrangement is separate and distinct electrical connection and mechanical engagement elements, they could be combined into one electrical/mechanical connection to eliminate dowel pins 218.

Top 213 of heater block housing 202 has an opening wherein heat transferring surface 214 is fixedly mounted. Extending about one-fourth inch above heat transferring surface 214 is multifunction bar or projection 216. This bar or a plurality of bars of FIGS. 20, 26, 27 and 35 are for enabling a user to remove the heat transfer element 200 from the drawer of the chamber without the use of tools. These multifunction bars 216 also support template 230 of FIG. 19 which positions at least a portion of the container of food directly above heat emitting surface 214. Although each of these two functions could be performed with a separate element, it is preferable that the positioning template supporting function and the heater removal enabling function be comprised in a single element 216. In addition, it is preferable that this multifunction bar also be made of thick polypropylene and be integral to housing block 202.

Figure 29:
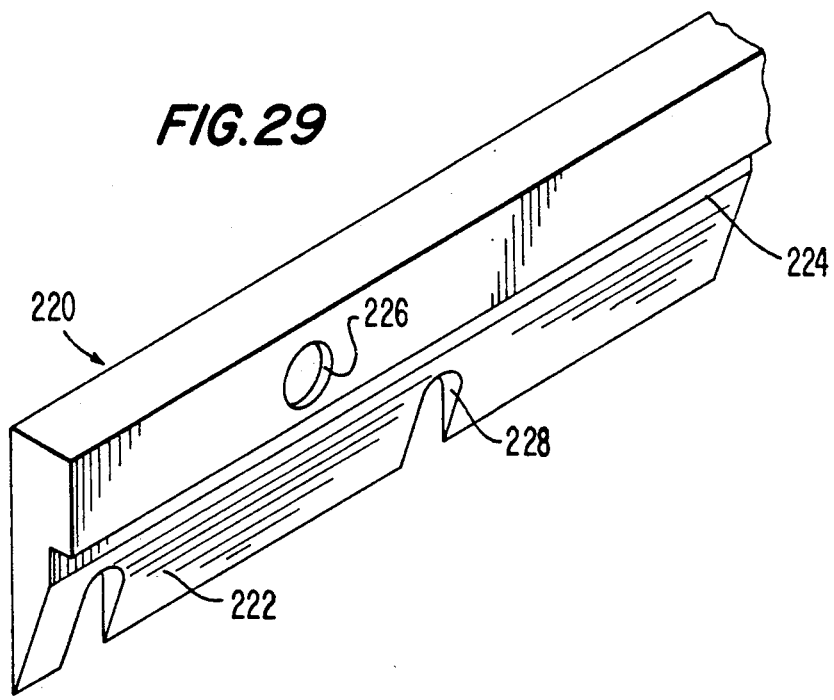
FIG. 29 is a perspective view of the heater positioning shim of FIGS. 19 and 20.
Figure 30:
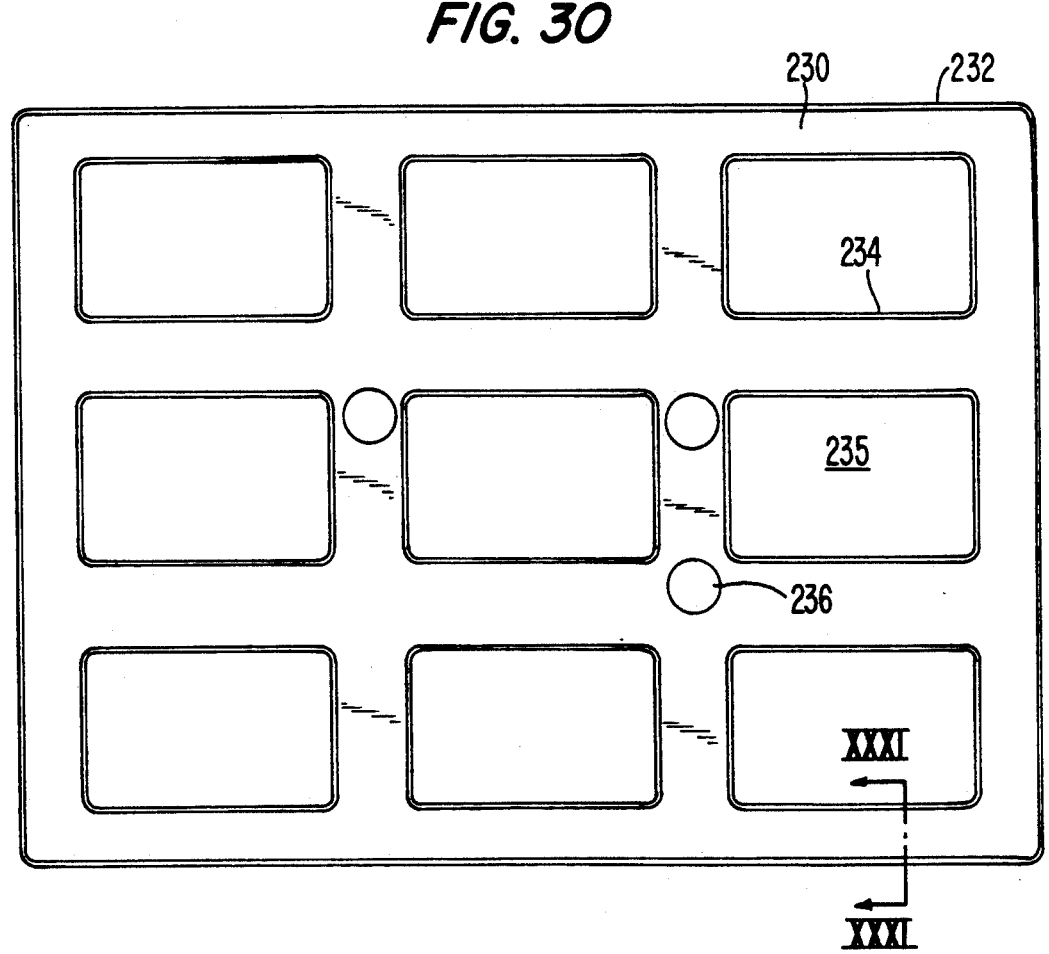
FIG. 30 is a top view of the container receiving template of FIG. 19.
Figure 31:
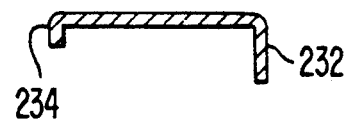
FIG. 31 is a sectional view along line XXXI—XXXI of FIG. 30.

As illustrated in FIGS. 19, 20 and 29, the apparatus further includes a relatively thin polypropylene shim 220 for positioning heat transfer element 200 in drawer 120. As illustrated in FIG. 29, shim 220 includes tapered or wedge shaped surface 222 to be inserted between side wall 205 of heat transfer element 200 and side wall 122 of supporting drawer 120. This wedge shaped surface portion is for initial insertion to move heat transfer element 200 towards its desired position. Shim 220 also includes flattened or straight portion 224 disposed directly adjacent and above wedge shaped surface portion 222 for holding heat transfer element 200 in its desired position in drawer 120.

In addition, shim 220 has finger holes 226 or hooks, disposed integral to or above the flattened or straight portion 224, for allowing an operator to remove the shim from between heat transfer element 200 and drawer 120 without the use of tools. Finally, one could also have curved portions 228 in shim 220 for avoiding any drawer screws or the like.

FIGS. 19, 30-32 and 35 illustrate a template, container separator, or container receive 230 for aligning containers over heat transfer elements 200. In particular, template 230 is disposed on at least one bar 216 of heat transfer element 200 for releasably positioning a center of a container 250 of food directly above a heat transfer surface 214. This template or container positioning element can have rims 234 defining a plurality (preferably nine) of rectangular apertures 235 with each aperture for receiving one of the containers 250 of food to be heated. Each aperture of template 230 is rectangular. The template is easily located with individual containers while in drawer 120 as in FIG. 19 or it can be fully loaded with containers before being place, fully loaded in the drawer.

Although template 230 is supported by bar or bars 216 of the heating elements 200, outer downward rim 232 can be used to contact drawer horizontal platforms 145 and 147 of FIG. 20 for additional support. The template is dishwashable and also, if desired, made of such material to be discardable. It can include gaps 236 for increasing heated air transfer through the template to enhance convection heating. It can also have grooves (not shown) on its top for receiving any spillage of food. In addition, rims 232 and 234 add stiffness to template 230.

Figure 32:
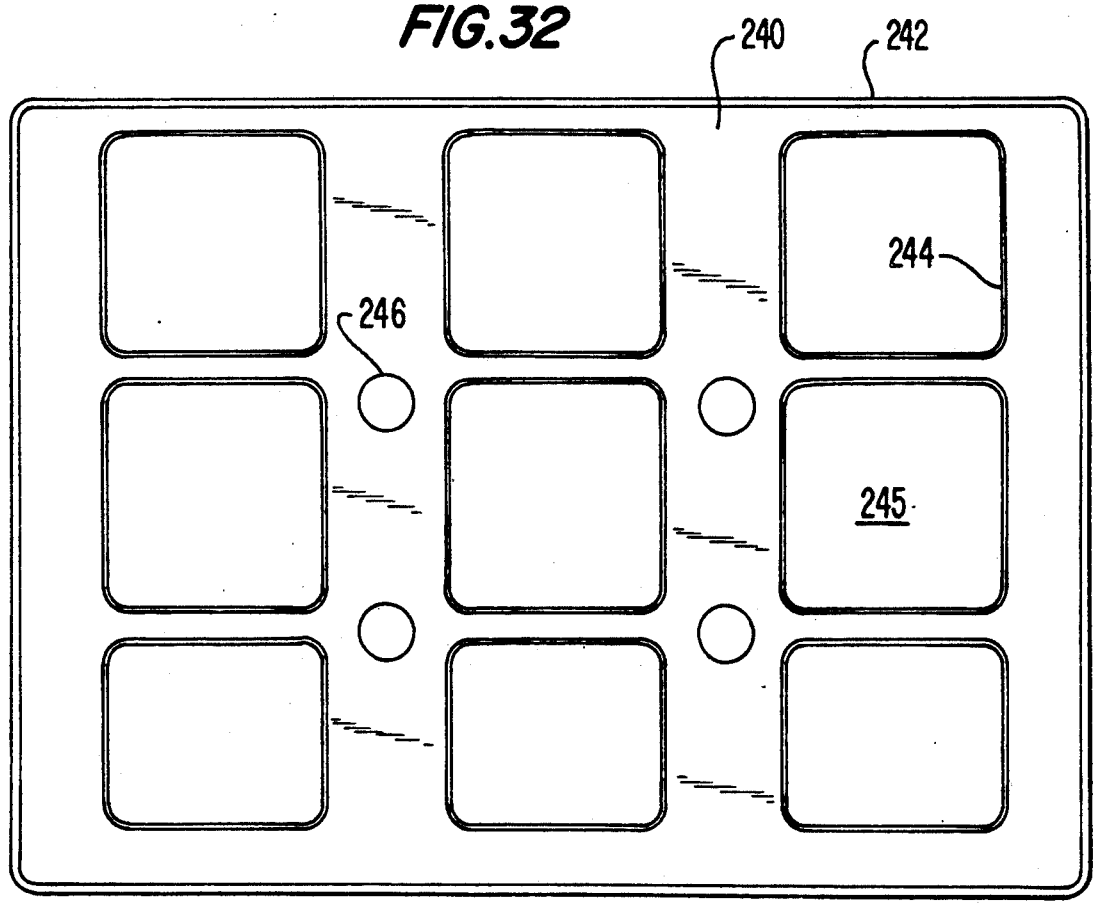
FIG. 32 is a top view of an alternative template.

Alternative template 240 of FIG. 32 differs from template 230 in that apertures 245 defined by rim 244 are square rather than rectangular. Template 240 also includes outer downward rim 242 and gaps 246. By having the templates removable, one can easily switch between square containers, rectangular containers or other shaped containers instead of having a system fixed to certain shaped containers.

In summary, the preferred embodiment provides for a modular construction to ease removability, for among other reasons, ease of cleaning the entire apparatus.

Improved Conduction/Convection Heating

The preferred embodiment also provides for heating by conduction in combination with heating by convection.

This embodiment is directed to eliminating the complexity of combined refrigeration/heating chambers. Instead, provided is chamber 50 for heating only. Chamber 50 of FIGS. 7, 10 and 12 includes an inner side 52 having at least an open end 53 which can be substantially closed to ambient air. As seen in FIG. 35, a top portion of food 251 in this chamber remains uncovered. To reiterate, a heat only chamber does not have refrigeration capabilities. After heating, the containers of hot food are united with cold food on trays 248 which are outside the chamber. Not only is the complexity of combined refrigeration/heating chambers eliminated, but the added need for insulated domes or covers and the extra effort in loading and removing insulated domes is eliminated.

As shown in FIG. 35, chamber 50 includes a plurality of heat transfer elements 200 with these elements 200 disposed in different horizontal planes. The plurality of heat transfer elements are preferably disposed in eighteen different horizontal planes.

Also shown in FIG. 35 is a heat transfer surface 214, of heat transfer element 200, which is inside the chamber and in contact with container 250 of food to be heated. This heat transfer surface 214 is preferably facing upward. It is also preferable that heat transferring surface 214 be substantially flat. A flat surface on the bottom of container 250 which interfaces with a flat top of heat transfer surface 214 is good for conduction heating.

Inside the chamber and disposed above and adjacent to container 250 of food is bottom portion or underside 123 of drawer 120. As seen in FIG. 35, this bottom portion 123 is a substantially planar surface which directs heated air in the chamber towards food in a subjacent container. As discussed, an upper portion of heated air directing drawer 120 supports a plurality of heat transfer elements 200. Thus, the drawer performs the functions of supporting a plurality of heat transfer elements and directing heated air to a plurality of containers which are in contact with a plurality of subjacent heat transfer elements disposed on a subjacent drawer.

This heated air directing surface 123 in effect blocks the upper flow of heat from heat transfer surface 214. As a result, heat transfer element 200 provides conduction heat to container 250 of food and heat transfer element 200, in combination with heated air directing surface 123, provides convection heat to the same container 250 of food. Consequently, the food in the bottom initially heats up by conduction while frozen food on the top initially thaws by convection.

Although the preferred embodiment has the heated air directing element associated with bottom portion 123 of drawer 120, it does not have to be associated with drawer 120 to achieve the same results. The heated air directing element is not, however, in contact with or part of the container of food to be heated so that an uncovered container of food can be quickly loaded and unloaded from the chamber and the user does not have to unload and reload the heated air directing element with each container. Thus, with the present invention, the unloading and reloading of containers is simplified.

The standard container 250 of food is made of disposable plastic and is about one inch tall. Food 251 normally extends approximately one-half inch above the container top. This heated air directing surface 123 is normally one-half inch above the top of food 251 and two inches above heat transfer surface 214. Designing a one-half inch gap between surface 123 and food 251 leaves room for accommodating overplating of food 251 on container 250. Heated air directing surface 123 could be made closer, however, to the top of the food if the overplating concerns could be minimized. Such a structure would be even more efficient at convection heating, because the quicker the top portion of the frozen food in a container could be thawed, the quicker the heating of the entire serving of food could occur.

When cooking frozen foods there is, however, an upper limit to the distance between the food and the heated air directing surface. As heated directing surface 123 gets much beyond three inches away from the top of heat transfer surface 214, the ability of the apparatus to thaw the top of frozen food may be limited. Thus, the convection heating may not be sufficient to thaw the top portion of the food in time before the bottom portion of the food is scorched under conduction heating.

The preferred structure for a combination of conduction and convection heating results in better food quality in a reasonably fast time. In fact, with one pound or less of food (the standard amount is ten to twelve ounces) that has already been tempered to between 40° F. and 50° F., the combined conduction and convection oven of the present invention will retherm food to between 180° and 200° F. in less than 50 minutes and more particularly in about 40 minutes. This cooking process is sped up over a pure convection heating oven, because of the addition of conduction heating. Also, by adding conduction heating to the convection heating process, it helps minimize the drying which can occur by solely convection heating.

To minimize the risk of burning or scorching the bottom of food while cooking frozen food, convection heating is added to the conduction heat process. The convection heating introduces heated air to the uncovered top portion of the food so that the top portion of the food can be initially thawed and then heated to a temperature between 180° and 200° F., before the bottom is scorched. If container 250 of food was covered, the ability to heat by convection with this embodiment would be severely limited. By obtaining relatively better food quality in a reasonably fast time from containers that do not require the additional costs of covers, this combined conduction and convection oven has several attractions for convenience store, fast food establishments or other similar applications.

By allowing the cooking of frozen food, the tempering or lengthy thawing step is eliminated. Thus, the amount of storage space and inventory needed for tempering is reduced. This elimination of the the tempering step is attractive in, for example, the airline industry, where forecasting of meal requirements can now be done as little as one to two hours before the plane is to be loaded. In contrast, when the tempering step is involved, the meal requirements often must be estimated on the previous day so that the slow thawing process can be initiated. Since the amount of food needed for the flight is more predictable two hours before loading than a day before loading, food wastage is reduced.

A relationship between the heating time, the distance between the heat transfer surface and the heated air directing surface, the temperature of the heat to be provided and the amount of food to be placed in the apparatus has been determined. The distance between heated air directing means 123 and heat transfer surface 214 is such that when food in the container is less than one pound, the conduction heating step and the convection heat providing step, in combination, heat the food in the container from a temperature of less than or equal to 32° F. to a temperature between 180° F. and 200° F. in more than 35 minutes and less than 70 minutes. If frozen food which is ten to twelve ounces (the standard size) is in the container, this food will be cooked in the preferred embodiment in approximately sixty-four minutes. If five or six ounces of food is in the container, it will require less cooking time. If, however, one adds twenty or more ounces of frozen food to the container, one runs the risk in this combined conduction/convection heating oven of scorching the bottom of the food before the top portion of the food is heated to 180° and 200° F.

In particular, the conduction heating step thaws and heats the bottom half of the frozen food to approximately 70° to 90° F. in approximately 30–40 minutes. The convection heat providing step thaws the frozen top portion of the food to a temperature of approximately 50° in this same amount of time, 30–40 minutes. When a frozen layer (less than or equal to 32° F.) between the bottom and the top portions of the food is broken, the remaining heating of the food to a temperature between 180° and 200° F. happens in approximately ten to fifteen more minutes.

If before the insertion step, one preheats the chamber to approximately 120° F., and less than one pound of frozen food is added to the container, this food can be heated from a temperature of less than or equal to 32° F. to a temperature between 180° and 200° F. in less than 45 minutes.

Although increasing the temperature of the heat transfer surface 214 could bring the temperature of the food to between 180° and 200° F. in less than thirty-five minutes, doing so raises a substantial risk of scorching the bottom of a standard size serving of food. In the preferred embodiment, heat transfer surface 214 does not exceed a temperature of 280° F. (in fact, it is optimally in the 215°–235° F. range) even when frozen food is heated to a temperature between 180° and 200° F.

Consequently, the present invention achieves relatively better quality food with the desired frozen food heating function by using a heat which is under 280° F. for over thirty-five minutes.

In addition, the combined conduction and convection oven requires less overall heat than a pure convection oven. A convection heat only oven usually requires heating the chamber to the 350° range. When the temperature of food 251 in container 250 in chamber 50 is equal to or greater than 180° F., the temperature of the air in chamber 50 is greater than 100° F., but less than 180° F. In fact, the temperature of the air in chamber 50 will more likely be greater than 100° F., but equal to or less than 150° F. Thus, the addition of conduction heating to a convection oven requires less overall heat, less time and lower cost.

The chamber of the preferred embodiment involves minimal irradiating heat from chamber walls 60, 62 and 64. The walls do reflect heat, but this reflection has a minimal effect on the convection heating and even less effect on the conduction heating. Generally, the chamber walls will reach approximately 120° F. when the food in the container reaches a temperature between 180° and 200° F.

This apparatus can also automatically determine the amount of time needed to heat the food in the container to a temperature between 180° and 200° F. Thus, after providing the conduction/convection heating steps, the apparatus can stop the heating of the food when the temperature of the food in the container is between 180° and 200° F.

In addition, it is contemplated that one could control each heat transfer element individually to selectively operate only certain heaters. This would be useful if some containers contained frozen food and if some containers contained rethermed or thawed food. Also this function could save power if the chamber is not completely full.

In summary, the present invention provides an improved method and an apparatus for heating food in a container by a combination of conduction and convection heating. This invention improves food quality, simplifies loading and unloading of containers, eliminates the added costs of container covers and eliminates the complexity of combined refrigeration/heating chambers.

Improved Insulation

One method for improving insulation (i.e. reducing the amount of heat escaping from the chamber) in the present invention is by minimizing the chamber to frame contact. Another method is to have a minimum clearance between drawers and chamber spacer bars when the system is open. In addition, insulation can be improved by obtaining a tight connection of the drawer with the spacer bars.

With respect to minimizing chamber to frame contact, chamber 50 as shown in FIGS. 7, 10, 11 and 12, includes side walls 62 and 64 and rear wall 60. The chamber also includes projecting portions 54, 56, 58 extending outwardly from chamber 50. This chamber can be used for food storage or preferably for a combination of food storage and food heating.

These chamber walls are preferably integral to each other and also preferably help define a substantially closed vessel. One could, however, insert a fan for enhancing air flow in the chamber. This fan would stabilize the temperature of the chamber from the top to the bottom of the chamber. This fan would tend to lessen the insulation effect of the chamber. Therefore, it is preferable to not have the fan, but rather to substantially close the chamber to ambient air as illustrated in FIGS. 1, 2 and 4. Also, one can optionally add a valve in the chamber to optimally adjust the pressure and possibly introduce steam into the chamber if desired.

Shown in FIGS. 8 and 9 is frame 20 for supporting chamber 50. Frame 20 is in contact with the chamber at chamber projecting portions 54, 56 and 58 only. In particular, this frame 20, preferably of aluminum, includes a plurality of vertical columns in which three of the four columns 21, 22 and 24 are shown. These columns are in contact with the chamber projecting portions, and they define inner chamber receiving portion 30 of FIGS. 714 9. Also shown in FIGS. 8 and 9 are bottom 27 and top portion 28 of frame 20. As shown in FIG. 13, the columns preferably have a tubular hollow interior 29 to further improve insulation.

As illustrated in FIGS. 7, 11 and 12, the chamber projecting portions comprise a perimeter 54 extending outwardly about the partially open end 53 of the chamber and flanges 56 and 58 which extend rearwardly from each of chamber side walls 62 and 64. These chamber projecting portions are in a press fit contact with the chamber supporting frame. The projecting portions can also be, however, fitted to the chamber supporting frame by other means, such as by bolts or by welding.

The skin 15 of FIG. 1 is disposed about frame 20 and about a substantial portion of chamber 50 to define a cavity (not shown) between the skin and the chamber. This cavity is for receiving insulation between the skin and the chamber.

Figure 18:
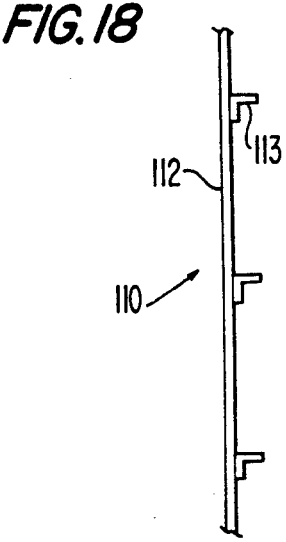
FIG. 18 is a partial side view of the front panel of FIG. 16.
Figure 16:
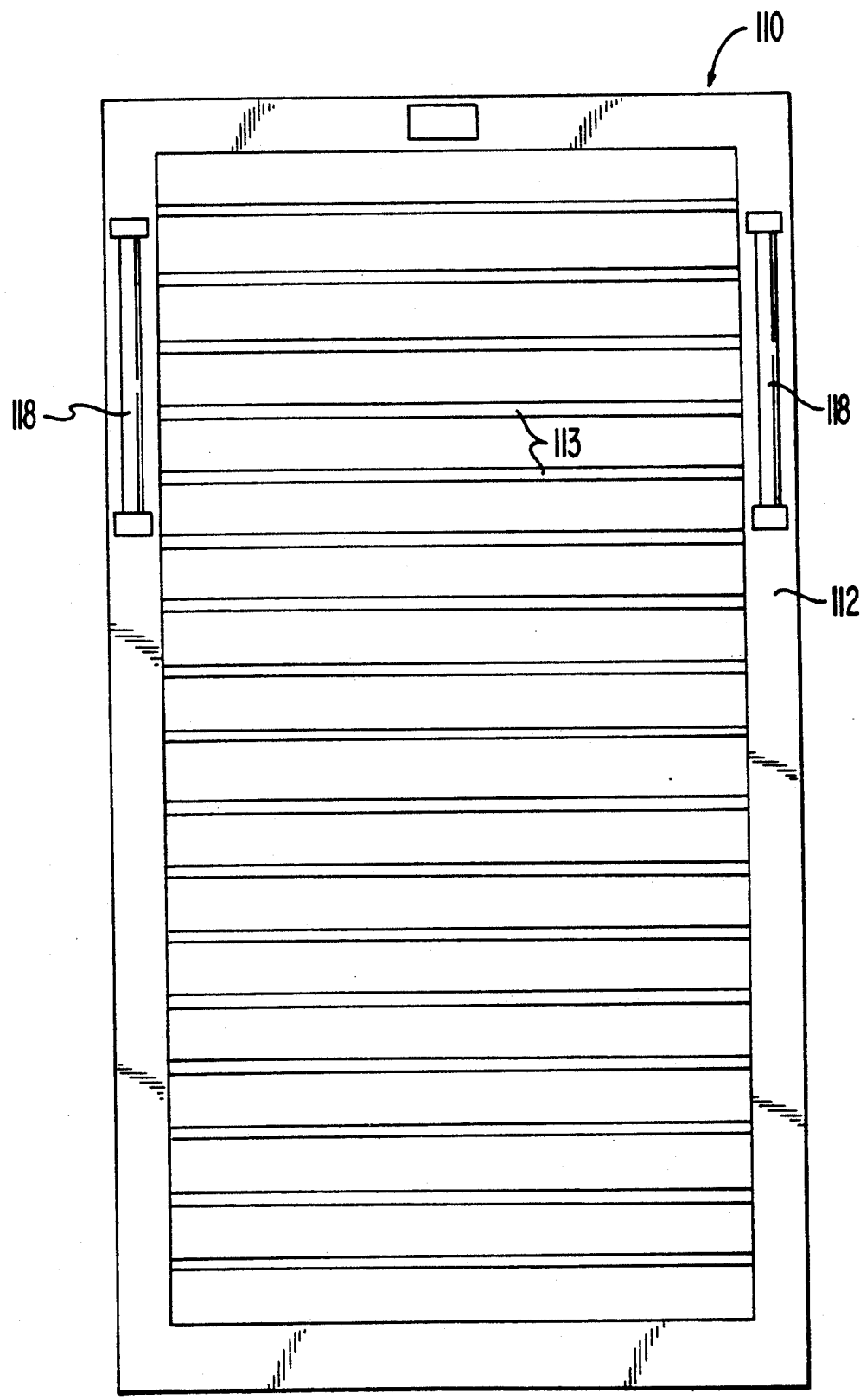
FIG. 16 is a front view of a front panel of the food service apparatus.

As illustrated in FIGS. 1, 16 and 18, panel 110, in combination with door front wall 122, periodically seal the open end of the chamber from ambient air as in FIGS. 1 and 4. Front panel 110 of FIGS. 16-18 can be integral to the frame or chamber and it preferably has a face perimeter 112 of a single sheet of aluminum as in FIGS. 16 and 18. This panel also includes an aperture 115 as in FIG. 16 for receiving power indicator light 18 of FIG. 1. When open end 53 of the chamber is sealed and the food is at a temperature between 180° and 200° F., this apparatus can maintain the food in that temperature range for approximately one hour.

To minimize open door heat loss in a chamber while unloading heated containers, the present invention has a minimum clearance between drawers 120 and spacer bars 113 when the system is open. This food storage apparatus maintains food in container 250 which is disposed inside chamber 50 and on a container supporting drawer 120 at a desired temperature while a portion of the same container supporting shelf or drawer 120 is disposed outside chamber 50. To obtain this function, a plurality of substantially horizontal spacer bars 113 are disposed across the open portion 53 of the chamber and define a plurality of apertures having two substantially parallel horizontal sides as in FIGS. 16 and 17. Spacer bars 113 are preferably disposed between side walls 62 and 64 of chamber 50 on an inner side 52 of the chamber as in FIG. 17, to attain a tighter seal between spacer bars 113 and chamber 50. In fact, these spacer bars 113 are preferably disposed against the side walls of the chamber on an inner side of the chamber.

Adjacent spacer bars 113 are spaced a sufficient distance apart to allow containers of food on drawer 120 to be received in chamber 50, but are also spaced sufficiently close together to substantially prevent ambient air from entering inner side 52 of chamber 50 when drawer front wall 122 is moved away from contact with a first spacer bar 113. Preferably, the adjacent spacer bars 113 are approximately four inches apart to accomplish this function.

In particular, drawer 120 is removably received in one of the apertured defined by the spacer bars and has a closed position in which all containers 250 on supporting drawer 120 are in inner side 52 of chamber 50 and the chamber is substantially sealed from ambient air as in FIGS. 1 and 4. As seen in FIG. 23, each drawer 120 includes front wall 122 having a height which is greater than the height of drawer side supporting walls 126 and 128. The vertical distance between first spacer bar 113 and the top of the container supporting template 230 on the adjacent lower drawer 120 is less than three inches. In fact, the vertical distance between the first spacer bar and the top of the container supporting means of the adjacent lower drawer is preferably approximately two inches. In other words, only a small cavity of air is opened up when the drawer is moved away from contact with the first spacer bar.

One could also add wiper gaskets or the like on the spacer bars to further prevent heat from escaping the chamber. Such wiper gaskets would have to be designed, however, to avoid or to minimize contact with the food which is normally uncovered and projecting about one-half inch over the top of the container.

In operation, a first of spacer bars 113 contacts the front wall of an adjacent lower drawer 120 upon closing. The drawer 120 and first spacer bar 113 partially block ambient air from contacting a container of food on the same drawer 120 which is disposed in the chamber while a portion of the same drawer 120 is disposed outside chamber 50. For example, as drawer 120 is pulled out for access to the first row of three containers, this preferred embodiment minimizes the amount of time in which the remaining six containers in the drawer will be exposed to ambient air. Consequently, the container supporting drawer is disposed sufficiently close to a bottom of the adjacent upper spacer bar 113 to minimize the amount of ambient air which contacts food in a container 250 which is in the chamber when the drawer is not in a closed position and a portion of the same drawer 120 is disposed outside the chamber.

Preferably, when the food is heated, heat transfer element 200 generates sufficient pressure in chamber 50 to substantially prevent ambient air from entering chamber 50 between first spacer bar 113 and container supporting template 230 on drawer 120 when a portion of the drawer is disposed outside the chamber. A bottom of an adjacent upper spacer bar 113 is less than three inches above the heat transfer element 200. Consequently, with heated air pressure generated in the chamber, the initial air flow upon opening a drawer is outward to initially prevent cold air from entering the chamber.

An alternative or additional insulation advantage is achieved by a tight connection of the drawer with spacer bars. In accordance with this advantage, seal 142 is mounted on an interior of front wall 122 of drawer 120 and contacts at least one spacer bar 113 when drawer 120 is in a closed position. In particular, the mechanical engagement between the drawer and the chamber creates sufficient tension against drawer front wall 122 to force seal 142 tightly against at least one bar 113. In operation, the seal on the front wall of the drawer closes up any gaps between the drawer and the spacer bars to substantially prevent heat from escaping from this area during and after the heating process. Therefore, when drawer 120 of this structure is in a closed position and a container of food in drawer 120 is at a temperature between 180° and 200° F., the apparatus maintains the food between 180° and 200° F. for approximately one hour.

In summary, the above-described structures for improving insulation enhance the ability of the present invention to prevent heat from escaping after heating the containers of food. This improved insulation in the apparatus is especially advantageous in heat only chambers where there is usually no insulated cover over the container of food to be heated.

Waterproof Electrical Connections

The present invention includes waterproof electrical connections between chamber 50 and drawer 120, drawer 120 and heat transfer element 200 and between adjacent heat transfer elements 200.

As seen in FIG. 24, chamber has a cavity 76 housing the accessible portions 80 and 81 of terminals 72. An open end of cavity 76 faces inner side 52 of chamber 50. Cavity 76 is preferably included in the electrical panel mounted on rear wall 60 of the chamber to provide a terminal point where power from an external power source is supplied to the inner side of the chamber. The chamber has an aperture 69 adjacent terminal portions 80 and 81 for allowing the power distribution conduit 170 of drawer 120 to releasably electrically connect to the accessible terminal portions.

Preferably, the first and second accessible terminal portions 80 and 81 are disposed at a distance of greater than twenty inches from each other. Thus, the likelihood of an individual placing their fingers against both terminals of a circuit is reduced and safety is improved.

A rubber washer in combination with a shroud serve as waterproofing elements for preventing fluid which is adjacent the accessible portions 80 and 81 of the terminal from leaking out the inner side of the chamber. As shown in FIGS. 22 and 23, rubber washer 84 is disposed between terminal 72 and an outside of panel 70. The rubber washer 84 helps to prevent water from escaping the chamber about the terminal portion of the electrical panel. As illustrated in FIG. 24, plastic shroud 75 surrounds the electrical terminal and forms cavity 76 in the electrical panel 70. Also shown in FIG. 24, is floor 78 of shroud 75 which is graded downwardly for drainage and plastic flange 79 disposed about the shroud ends for helping to prevent water from escaping the chamber about the electrical panel area. Flange 79 preferably defines an opening less than one inch in length and less than one inch in width. Consequently, fluid in the inner side of the chamber will be substantially prevented from leaking out through electrical panel 70 of the chamber.

The connector between drawer 120 and chamber 50 is also waterproofed. As shown in FIG. 22, sealant 186 is disposed between heater receptacle 182 and conduit 170 for preventing fluid from entering the power distribution conduit at receptacle 182. Also, a sealant (not shown) is disposed inside the power distribution conduit 170 of drawer 120 and adjacent each of prongs 180 and 181 for preventing fluid from entering the power distribution conduit at prong projecting portions 180 and 181. This allows one to immerse the removable drawer in an dishwasher or in another industrial strength cleaning structure without disabling the power distribution function of the drawer.

In addition, the connection between the power distribution elements of the drawer and the heat transfer elements is waterproofed. Drawer 120 includes side wall 148 adjacent first side wall 211 of heat transfer element 200. Power distribution conduit 170 of drawer 120 includes a female connector disposed substantially within the conduit and adjacent the side wall 148 of drawer 120. The female connector includes a receptacle 182 within the power conduit for receiving electrical connector 208 of heat transfer element 200. The female connector also includes rubber seal 183 for enabling an electrical coupling in the presence of fluid in the receptacle 182.

Heat transfer element 200 of FIGS. 25-28 is washable and totally immersible. In fact, even though heat transfer element 200 contains a male and female connector, it is pressure water cleanable. A male connector 208 is disposed in heat transfer element 200. Male connector 208 includes electrical prongs 217 projecting from first side wall 211. This male connector can electrically couple to female connector 206 of an adjacent heat transfer apparatus 200. This male connector also includes an electrical coupling enabling rubber seal 109. This hermetic seal 109 has portions substantially flush with first side wall 211 and disposed about a proximal portion of prongs 217.

Heat transfer element 200 also includes female connector 206 disposed within heater block housing 202 and adjacent second side wall 205 of heater block 202. Female connector 206 includes a receptacle for receiving electrical prongs 217 of male connector 208 of an adjacent heat transfer element.

Female connector 206 also includes the ability to make the receptacle waterproof. In particular, female connector 206 includes rubber seal 207 for enabling an electrical coupling with the receptacle even in the presence of fluid in the prong receiving receptacle. This female connector electrical coupling enabling rubber seal 207 is a hermetic seal having apertures directly adjacent the prong receiving receptacle. Also, seal 207 is substantially flush with second side wall 205 of the heat transfer element. Consequently, when female connector 206 receives male connector 208 of an adjacent heat transfer element, each of the male and female connector electrical coupling molded rubber seals 207 and 209 are in contact with each other. The seals 182, 207, and 209 are either made of molded or vulcanized rubber.

It is contemplated that the entire electrical system could be fabricated in a manner to meet nationally recognized safety standards, such as the National Electrical Code. It is also contemplated that the entire electrical system could be constructed of suitable materials to be recognized by rating agencies such as Underwriter's Laboratories, Inc.

In summary, the chamber, drawer and heat transfer element include waterproof connections which enhance the removability of the components, the cleanliness of the apparatus, and the safety to the users.

Numerous characteristics and advantages of the invention have been described in detail in the foregoing description with reference to the accompanying drawings. However, the disclosure is illustrative only and the invention is not limited to the precise illustrated embodiments. Various changes and modifications may be effected therein by persons skilled in the art without departing from the scope or sphere of the invention.

We claim:

1. A food preparation apparatus comprising:
   a chamber;
   an electrical terminal mounted on said chamber;
   a first removable heat transfer element disposed in said chamber;
   means for supporting said first heat transfer element, said supporting means removably received in said chamber and including:
     means for releasably electrically connecting said supporting means to said terminal; and
     means for distributing power from said electrical connection means to said first heat transfer element;
   a second heat transfer element disposed on said supporting means and releasably electrically connected to said first heat transfer element such that said first heat transfer element remains on said supporting means when said second heat transfer element is removed from said supporting means; and
   said first heat transfer element includes means for releasably electrically connecting to said power distribution means.

2. The apparatus as in claim 1, further comprising a third heat transfer element disposed on said supporting means and releasably electrically connected to said second heat transfer element.

3. The apparatus as in claim 1, further comprising means, disposed above a portion of said first heat transfer element, for releasably positioning a center of a container of food to be heated over said first heat transfer element.

4. The apparatus as in claim 1, wherein said removable supporting means defines a drawer.

5. The apparatus as in claim 1, wherein said supporting means further comprises means for releasably mechanically engaging said chamber.

6. The apparatus as in claim 5, wherein said supporting means electrical connection means and mechanical engagement means form a unitary element.

7. The apparatus as in claim 6, wherein a portion of said chamber terminal is disposed about at least a portion of the unitary element of the supporting means in a snap-type connection.

8. The apparatus as in claim 6, wherein said unitary element of said removable supporting means includes a prong projecting from said supporting means and having a distal end wider than a proximate end, and said terminal includes a spring clip disposed about said wider distal end of said prong.

9. The apparatus as in claim 1, wherein said first heat transfer element further comprises means for releasably mechanically engaging said supporting means.

10. The apparatus as in claim 9, wherein said first heat transfer element electrical connection means and mechanical engagement means are separate and distinct elements.

11. The apparatus as in claim 1, wherein said supporting means and said first heat transfer element are each removable from the apparatus without the use of tools.

12. The apparatus as in claim 1, wherein said first heat transfer element further comprises a heat transferring surface and means, extending above the heat transferring surface, for enabling removal of said first heat transfer element without the use of tools.

13. The apparatus as in claim 1, wherein said chamber is for heating only.

14. The apparatus as in claim 1, further comprising a plurality of heat transfer elements and said plurality of heat transfer elements are disposed in the same horizontal plane of said chamber.

15. The apparatus as in claim 1, wherein said supporting means further comprises a side wall and said means for electrically connecting said supporting means to said terminal projects from said side wall of said supporting means.

16. The apparatus as in claim 1, wherein said first heat transfer element further comprises a side wall and said means for electrically connecting to said power distribution means of said supporting means projects from said side wall of said first heat transfer element.

17. A food preparation apparatus comprising:
a chamber;
an electrical terminal mounted on said chamber;
a plurality of removable heat transfer elements disposed in said chamber;
a plurality of drawers, arranged vertically, with each drawer supporting a plurality of said heat transfer elements, each of said drawers removably received in said chamber including:
  means for releasably electrically connecting said drawer to said terminal; and
  means for distributing power from said electrical connection means of said drawer to at least one of said heat transfer elements; and
at least one of said plurality of heat transfer elements includes means for releasably electrically connecting to said power distribution means of one of said drawers;
wherein at least one of said heat transfer elements is individually removable from at least one of said drawers such that when a first of said heat transfer elements is removed from said at least one drawer, a second of said heat transfer elements remains releasably electrically connected to said power distribution means in said at least one drawer.

18. The apparatus as in claim 17, wherein each of said drawers removably receives nine heat transfer elements.

19. The apparatus as in claim 17, wherein said chamber removably receives eighteen vertically arranged drawers.

20. The apparatus as in claim 17, wherein said chamber is for heating only.

21. The apparatus as in claim 17, further comprising means for positioning at least some of said plurality of heat transfer elements in one of said drawers, said positioning means being removable without the use of tools.

22. The apparatus as in claim 17, wherein each of said drawers provide separate access to a plurality of removable heat transfer elements.

23. An apparatus for transferring heat to a container of food comprising:
means for emitting heat;
means for housing at least a portion of said heat emitting means including a side wall;
means for electrically connecting said heat emitting means to a power source, said connecting means including an electrical plug projecting from said side wall of said housing means;
an electrical receptacle projecting from said side wall of said housing means, said electrical receptacle receiving an electrical plug of an adjacent heat transferring apparatus;
said housing means including a top having an opening;
said means for emitting heat fixedly mounted in said opening on said top of said housing means; and
means, extending from said top of said housing means, for supporting a device which positions a container of food directly above said heat emitting means.

24. An apparatus as in claim 23, wherein said apparatus includes at least two projections extending from said side wall of said housing means and separated by said plug of said electrical connection means.

25. An apparatus as in claim 24, wherein said projections are spaced sufficiently far apart to substantially prevent said plug of said electrical plug means from being bent upon connection to an electrical receptacle.

26. An apparatus as in claim 23, wherein said apparatus further comprises means, extending from said top of said housing means, for allowing a user to remove the heater from the chamber without the use of tools.

27. An apparatus as in claim 26, wherein said positioning device supporting means and said heater removal means comprise a single element.

28. An apparatus as in claim 23, wherein said positioning device supporting means is integral to said housing means.

29. An apparatus for heating a container of food comprising:
a chamber;
a frame disposed about said chamber;
a heat transfer element inside said chamber; and
connecting means for supplying power to said heat transfer element including means, disposed on said frame and external to said chamber, for connecting the apparatus to a receptacle of an external power source, said connecting means having:
  a fastener for connecting said connecting means to said frame;
  a plug; and
  means for adjusting the plug position as it mates with the external power source receptacle including a rubber-like grommet disposed about said fastener.

30. A food preparation apparatus comprising:
a chamber including:
  an inner side for receiving a plurality of removable heat transfer elements;
  a first electrical terminal having a portion accessible from the inner side of said chamber for providing power to the inner side of said chamber; and
  a second electrical terminal in substantially the same horizontal plane as said first electrical terminal and having a portion accessible from the inner side of said chamber for providing power to the inner side of said chamber;
means for transferring power from an external power source to said terminals;
waterproofing means, disposed adjacent said chamber terminals, for preventing fluid which is adjacent the accessible inner side portion of said terminals from leaking outside of said chamber; and
means, removable from said inner side of said chamber, for distributing power from said terminals to said removable heat transfer elements;
said removable power distribution means releasably engaging said first and second terminals of said chamber; and wherein said first and second terminals are disposed a distance of greater than twenty inches from each other.

31. The apparatus as in claim 30, further comprising means, removable from said inner side of said chamber, for distributing power from said terminals to said plurality of removable heat transfer elements;
wherein said chamber has an aperture adjacent said chamber terminals for allowing said power distribution means to releasably electrically connect to said accessible portion of said chamber terminals; and
said waterproofing means prevents fluid in said inner side of said chamber and adjacent said aperture from leaking outside of said chamber.

32. The apparatus as in claim 30, further comprising means, removable from said inner side of said chamber, for distributing power from said terminals to said removable heat transfer elements; and
wherein said terminals include a spring-like clip projecting toward the inner side of said chamber for releasably electrically connecting to said removable power distribution means.

33. The apparatus as in claim 30, wherein said waterproofing means includes a rubber washer disposed about said terminals.

34. The apparatus as in claim 30, wherein:
said chamber has a cavity housing the accessible portion of said terminals with an open end of said cavity facing the inner side of said chamber; and
said waterproofing means includes a shroud disposed about said accessible terminal portions, said shroud including a flange disposed about said open end of said cavity for preventing fluid which is in the inner side of said chamber and adjacent the cavity from leaking outside of said chamber.

35. The apparatus as in claim 34, wherein said shroud includes a lower surface graded downwardly towards said open end of said chamber cavity.

36. The apparatus as in claim 34, wherein said flange of said shroud which is disposed about said open end of the chamber cavity defines an opening less than one inch in length and less than one inch in width.

37. The apparatus as in claim 30, wherein said power transferring means comprises an electrical panel mounted on said chamber and said terminals are in electrical contact with said panel.

38. The apparatus as in claim 37, wherein said waterproofing means includes means for sealing said electrical panel to said chamber so that fluid in the inner side of said chamber is substantially prevented from leaking through the electrical panel to outside of said chamber.

39. A food preparation apparatus comprising:
a food preparation chamber including an inner side and means for supplying power to said inner side of said chamber;
a heat transfer element removably received in said inner side of said chamber including first and second substantially parallel walls;
a male connector, disposed in said heat transfer element including:
an electrical prong projecting from said first wall; and
means for enabling an electrical coupling with said prong even in the presence of fluid on said prong; and
a female connector disposed substantially within said heat transfer element and adjacent said second wall including:
means for receiving an electrical prong of an adjacent heat transfer element; and
means for enabling an electrical coupling with said receiving means even in the presence of fluid in the prong receiving means; and
power distribution means, disposed in said inner side of said chamber, for supporting said heat transfer element and including means, electrically connected to said chamber power supply means, for distributing power from the chamber power supply means to said removable heat transfer element, said power distribution means including:
a wall adjacent the first wall of said heat transfer element; and
a female connector disposed substantially within and adjacent said wall of said power distribution means, said female connector including:
means for receiving said electrical prong of said heat transfer element;
means for enabling an electrical coupling in the presence of fluid in the receiving means of the power distribution means female connector; and
means disposed on said heat transfer element for supporting food within said chamber.

40. The apparatus as in claim 39, wherein said heat transfer element female connector electrical coupling enabling means includes a hermetic seal having apertures directly adjacent said female connector prong receiving means.

41. The apparatus as in claim 39, wherein said heat transfer element male connector electrical coupling enabling means includes a hermetic seal disposed about a proximate portion of said electrical prong.

42. The apparatus as in claim 39, wherein said heat transfer element female connector receives a male connector of an adjacent heat transfer element, each of said male and female connector electrical coupling enabling means are in contact with each other.

43. An apparatus for transferring heat comprising:
means for emitting heat;
means for housing at least a portion of said heat emitting means including first and second substantially parallel walls;
a male connector including:
an electrical prong projecting from said first wall of said housing means; and
means for enabling an electrical coupling with said electrical prong even in the presence of fluid on the electrical prong; and
a female connector disposed within said housing means and adjacent said second wall of said housing means, including:
means for receiving an electrical prong of an adjacent heat transferring apparatus; and
means for enabling electrical coupling with said receiving means even in the presence of fluid in said female connector receiving means;
wherein said housing further comprises a top surface having an aperture for receiving said heat emitting means with at least a portion said heat emitting means being exposed.

44. The apparatus as in claim 43, wherein said male connector electrical coupling enabling means includes a hermetic seal which is both extending about a port of said electrical prong and is substantially flush with said first wall of said housing means.

45. The apparatus as in claim 43, wherein said female connector electrical coupling enabling means includes a hermetic seal substantially flush with said second wall of said housing means having apertures associated with said prong receiving means.

46. The apparatus as in claim 43, wherein the male connector can electrically couple to a female connector of an adjacent heat transferring apparatus.

* * * * *

UNITED STATES PATENT AND TRADEMARK OFFICE
CERTIFICATE OF CORRECTION

PATENT NO. : 5,182,438
DATED : January 26, 1993
INVENTOR(S) : Kevin B. Cundiff et al It is certified that error appears in the above-indentified patent and that said Letters Patent is hereby corrected as shown below:

On the title page, under item [19], "Oakes et al" should read -- Cundiff--.

On the title page, item [75], reading "Inventors: Roger K. Oakes, Nashville; Kevin B. Cundiff, Brentwood, both of Tenn." should read --Inventor: Kevin B. Cundiff, Bentwood, Tenn.--.

Signed and Sealed this

Seventeenth Day of January, 1995

Attest:

BRUCE LEHMAN

Attesting Officer    Commissioner of Patents and Trademarks